United States Patent [19]

Ide

[11] Patent Number: 5,066,144
[45] Date of Patent: Nov. 19, 1991

[54] HYDRODYNAMIC BEARINGS HAVING A CONTINUOUS BEAM MOUNTED SUPPORT SURFACE

[76] Inventor: Russell D. Ide, P.O. Box 744, 641 Arnold Rd., Coventry, R.I. 02816

[21] Appl. No.: 516,977

[22] Filed: Apr. 30, 1990

Related U.S. Application Data

[63] Continuation-in-part of Ser. No. 309,081, Feb. 8, 1989, which is a continuation-in-part of Ser. No. 283,529, filed as PCT US88/01841 May 27, 1988, which is a continuation-in-part of Ser. No. 55,340, May 29, 1987, abandoned.

[51] Int. Cl.$^5$ .............................................. F16C 17/03
[52] U.S. Cl. ................................... 384/117; 384/119
[58] Field of Search ............... 384/122, 117, 104, 118, 384/100, 97, 119

[56] References Cited

U.S. PATENT DOCUMENTS

| | | | |
|---|---|---|---|
| 2,137,487 | 11/1938 | Hall . | |
| 2,203,039 | 6/1940 | Aker | 384/97 |
| 3,107,955 | 10/1963 | Trumpler . | |
| 3,460,875 | 8/1969 | Kelley | 384/97 |
| 4,099,799 | 7/1978 | Etsion . | |
| 4,496,251 | 1/1985 | Ide | 384/117 |
| 4,515,486 | 5/1985 | Ide | 384/117 |
| 4,526,482 | 7/1985 | Ide | 384/104 |
| 4,676,668 | 6/1987 | Ide | 384/117 |
| 4,738,453 | 4/1988 | Ide | 277/81 |
| 4,815,864 | 3/1989 | Jones | 384/104 |
| 4,927,275 | 5/1990 | Lawson | 384/117 |

FOREIGN PATENT DOCUMENTS 206686 12/1986 European Pat. Off. .
343620 11/1989 European Pat. Off. .

Primary Examiner—Lenard A. Footland
Attorney, Agent, or Firm—Marks Murase & White

[57] ABSTRACT

A hydrodynamic thrust, journal or combined radial and thrust bearing and methods of manufacturing the same. The bearing includes a continuous bearing surface and support structure which supports the surface such that the surface may change shape and move in any direction (six degrees of freedom) to optimize formation of a converging wedge for hydrodynamic operation, equalization of load across the bearing surface in thrust bearings and to adjust for any shaft misalignment. The support structure can include a repeating series of support structure portions each including a fully rigid portion a partially rigid portion and connecting portions connecting the spaced portions. Alternatively, the support structure can include a spaced series of deflectable ears which are arranged such that the continuous surface deforms when the ear portions are deflected. The bearing may also include an additional support portion which includes one or more beam-like or membrane members. The bearing may include separate elements, such as piezoelectric elements, to allow selective alteration of the deflection characteristics of the bearings. The bearing may be made self lubricating through the provision of a lubricant absorbing and releasing material in the spaces within the support structure. The bearings may be made of a wide variety of materials including, plastics, ceramics, powdered metals, composites and metals. The bearings may be manufactured by simple molding using a two-piece camless mold, injection molding, casting, powdered metal die casting, extrusion, electric discharge or laser cutting.

16 Claims, 16 Drawing Sheets

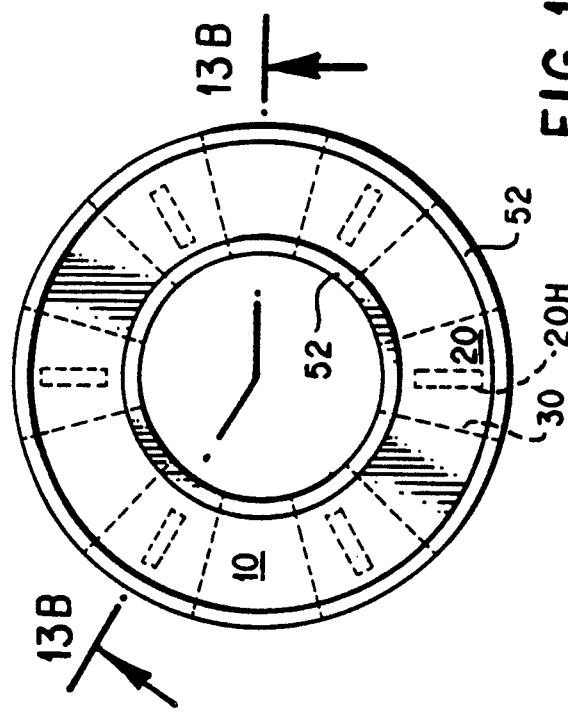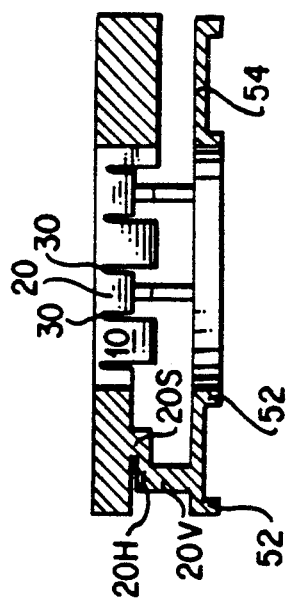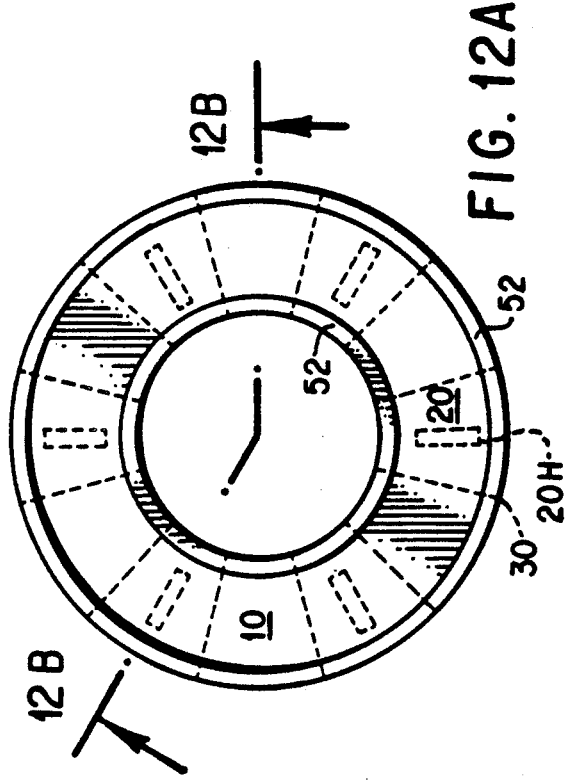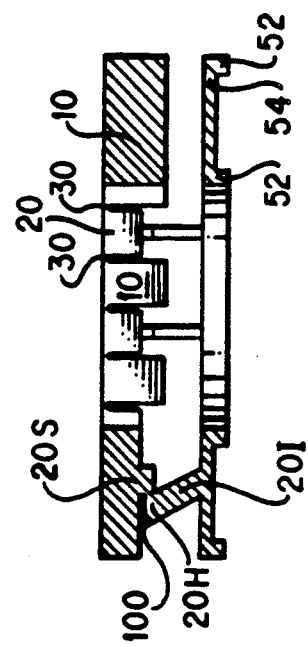

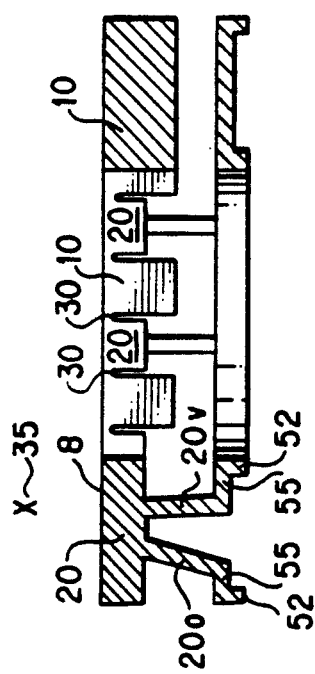
FIG. 15
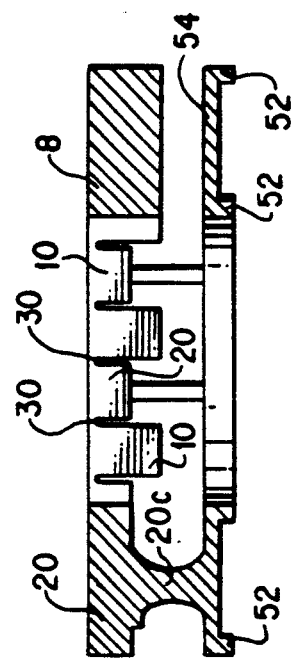
FIG. 16
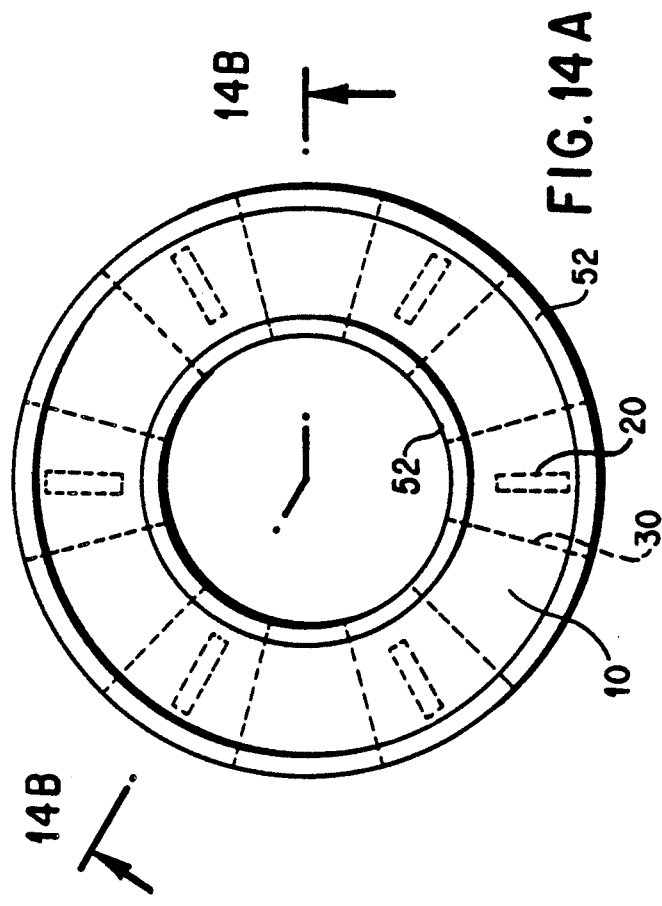
FIG. 14A
FIG. 14B
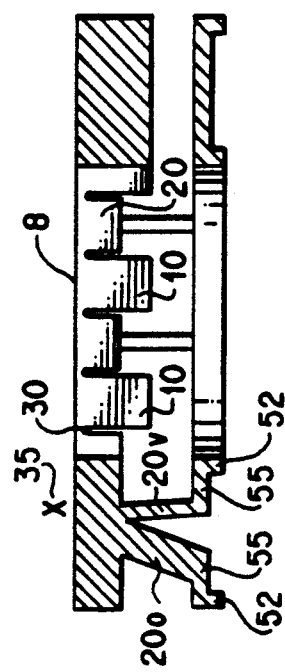

HYDRODYNAMIC BEARINGS HAVING A CONTINUOUS BEAM MOUNTED SUPPORT SURFACE

This application is a continuation-in-part of, and claims the benefit of 35 U.S.C. 120 with respect to the applicant's copending U.S. application Ser. No. 07/309,081, filed 2-8-89, which claimed the benefit of international application PCT/US88/01841, filed May 27, 1988, and is a C-I-P of U.S. application Ser. No. 07/283,529 filed as PCT US 88/01841 May 27, 1988, which in turn is a C-I-P of and claimed the benefit of applicant's U.S. patent application Ser. No. 07/055,340, filed May 29, 1987 and now abandoned.

BACKGROUND OF THE INVENTION

The present invention relates to hydrodynamic bearings In such bearings, a rotating object such as a shaft is supported by a stationary bearing pad via a pressurized fluid such as oil, air or water. Hydrodynamic bearings take advantage of the fact that when the rotating object moves, it does not slide along the top of the fluid. Instead the fluid in contact with the rotating object adheres tightly to the rotating object, and motion is accompanied by slip or shear between the fluid particles through the entire height of the fluid film. Thus, if the rotating object and the contacting layer of fluid move at a velocity which is known, the velocity at intermediate heights of the fluid thickness decreases at a known rate until the fluid in contact with the stationary bearing pad adheres to the bearing pad and is motionless. When, by virtue of the load resulting from its support of the rotating object, the bearing pad is deflected at a small angle to the rotating member, the fluid will be drawn into the wedge-shaped opening, and sufficient pressure will be generated in the fluid film to support the load. This fact is utilized in thrust bearings for hydraulic turbines and propeller shafts of ships as well as in the conventional hydrodynamic journal bearing.

Both thrust bearings and radial or journal bearings normally are characterized by discrete shaft supporting pads spaced about an axis. The axis about which the pads are spaced generally corresponds to the longitudinal axis of the shaft to be supported for both thrust and journal bearings This axis may be termed the major axis.

In an ideal hydrodynamic bearing, the hydrodynamic wedge extends across the entire bearing pad face, the fluid film is just thick enough to support the load, the major axis of the bearing and the axis of the shaft are aligned, leakage of fluid from the ends of the bearing pad surface which are adjacent the leading and trailing edges is minimized, the fluid film is developed as soon as the shaft begins to rotate, and, in the case of thrust bearings, the bearing pads are equally loaded. While an ideal hydrodynamic bearing has yet to be achieved, a bearing which substantially achieves each of these objectives is said to be designed so as to optimize hydrodynamic wedge formation.

In known radial pad type bearings, it has heretofore been believed necessary to provide an accurately determined clearance between the bearing and the rotating object supported so as to allow the appropriate deflection of the bearing pads to form the hydrodynamic wedge. The requirement of close tolerances is particularly troublesome in the manufacture of gas lubricated bearings. Another problem with gas lubricated bearings is the breakdown of the fluid film at high speeds. These problems have limited the use of gas lubricated hydrodynamic bearings.

U.S. Pat. No. 3,107,955 to Trumpler discloses one example of a bearing having beam mounted bearing pads that displaces with a pivoting or swing-type motion about a center located in front of the pad surface. This bearing like many prior art bearings is based only on a two dimensional model of pad deflection. Consequently, optimum wedge formation is not achieved.

In the Hall patent, U.S. Pat. No. 2,137,487, there is shown a hydrodynamic movable pad bearing that develops its hydrodynamic wedge by sliding of its pad along spherical surfaces. In many cases the pad sticks and the corresponding wedge cannot be developed. In the Greene Patent, U.S. Pat. No. 3,930,691, the rocking is provided by elastomers that are subject to contamination and deterioration.

U.S. Pat. No. 4,099,799 to Etsion discloses a non-unitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are disclosed.

There is shown in the Ide patent, U.S. Pat. No. 4,496,251 a pad which deflects with web-like ligaments so that a wedge shaped film of lubricant is formed between the relatively moving parts.

U.S. Pat. No. 4,515,486 discloses hydrodynamic thrust and journal bearings comprising a number of bearing pads, each having a face member and a support member that are separated and bonded together by an elastomeric material.

U.S. Pat. No. 4,526,482 discloses hydrodynamic bearings which are primarily intended for process lubricated applications, i.e., the bearing is designed to work in a fluid. The hydrodynamic bearings are formed with a central section of the load carrying surface that is more compliant than the remainder of the bearings such that they will deflect under load and form a pressure pocket of fluid to carry high loads.

It has also been noted in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments. These teachings are applicable to both journal and thrust bearings. While the disclosure of this patent represents a significant advance in the art, it has some shortcomings. One such shortcoming is the rigidity of the support structure and bearing pad which inhibits deformation of the pad surface. Further, the bearing construction is not unitary.

The last two patents are of particular interest because they demonstrate that despite the inherent and significant differences between thrust and journal bearings, there is some conceptual similarity between hydrodynamic journal bearings and hydrodynamic thrust bearings.

This application relates in part to hydrodynamic thrust bearings. When the hydrodynamic wedge in such bearings is optimized, the load on each of the circumferentially spaced bearings is substantially equal.

Presently, the most widely used hydrodynamic thrust bearing is the so-called Kingsbury shoe-type bearing. The shoe-type Kingsbury bearing is characterized by a complex structure which includes pivoted shoes, a thrust collar which rotates with the shaft and applies load to the shoes, a base ring for supporting the shoes, a housing or mounting which contains and supports the internal bearing elements, a lubricating system and a cooling system. As a result of this complex structure, Kingsbury shoe-type bearings are typically extraordinarily expensive.

An alternative to the complex Kingsbury shoe-type bearing is a unitary pedestal bearing which has been employed in, among other things, deep well pumps. This relatively simple structure is typically formed by sand casting or some other crude manufacturing technique. The bearing is structurally characterized by a flat base having a thick inner circumferential projection, a plurality of rigid pedestals extending transversely from the base and a thrust pad centered on each rigid pedestal.

The present inventor has also discovered that the center pivot nature of both the known rigid pedestal bearing shown and the Kingsbury shoe-type bearing contributes to bearing inefficiency. It should also be noted that, because of their rigid center pivots, neither the Kingsbury shoe-type bearings nor the pedestal bearing shown can deflect with six degrees of freedom to optimize wedge formation. Thus, while, in some instances, the prior art bearings are capable of movement with six degrees of freedom, because the bearings are not modeled based upon or designed for six degrees of freedom, the resulting performance capabilities of these bearings are limited.

Known hydrodynamic bearings, whether radial or thrust, all suffer (to varying degrees) from a number of problems. For example, prior art hydrodynamic bearings often suffer from fluid leakage which causes breakdown of the fluid film. In radial bearings, the leakage primarily occurs at the axial ends of the bearing pad surface. In thrust bearings, the leakage primarily occurs at the outer circumferential periphery of the pad surface as a result of centrifugal forces action on the fluid. What fluid leakage can be significantly reduced by supporting the bearing pads for optimum deflection, known bearing which have discrete pads (and consequently spaces in the bearing surface) inherently have some fluid leakage.

Further, it is difficult to optimize the quality of the finish of the bearing pad surface of conventional bearings having separate pads. The quality of the finish is important to ensure uniform fluid film distribution.

SUMMARY OF THE INVENTION

The present invention relates to a beam mounted hydrodynamic bearing in which the inside diameter of the radial bearing or the thrust face of the thrust bearing is continuous, such that individual pads are not defined or developed. This construction allows finish grinding-/lapping of the bearing surface to a quality which cannot be achieved with a bearing having discrete pads. Taken in conjunction with the absence of discontinuities in the bearing surface, this yields a bearing with superior fluid retention capabilities. The continuous bearing surface is supported by a, preferably unitary, support structure. The support structure is preferably defined by cuts in the bearing sides and back. For a radial bearing, the cuts would be facing and OD machining cuts. For the thrust bearing, the cuts would be on the back and sides.

In one embodiment, the support structure includes a repeating series of support sections. Each section includes a portion which is a fully rigid (i.e., substantially rigid in all directions), a first connecting portion having virtually no moment carrying ability or a substantially reduced moment carrying ability, and a partially rigid portion which is rigid in a first predetermined direction and flexible in a second predetermined direction which is substantially transverse to the first predetermined direction and a second connecting portion having virtually no moment carrying ability or a substantially reduced moment carry ability. The fully rigid portion of each section is connected to the second connecting portion (which has a substantially reduced moment carrying ability) of an adjacent section so as to define a continuous support network. The bearing may be a radial bearing, a thrust bearing, or a combined radial and thrust bearing. The vertical support portion, i.e., the portion which is rigid in a predetermined direction and flexible in a direction which is transverse to the predetermined direction, can be mounted on an additional support member which can be a rigid member, a flexible membrane and/or a beam network. Additionally, the vertical support portion may be formed with a reduced section to give it flexibility in a third direction. It is also possible to provide a lubricant absorbing material, such as a porous plastic, in the opening in the support structure and load the lubricant absorbing material with lubricant to provide ports communicating the source of lubricant to the continuous bearing surface.

Alternatively, the support structure for the continuous support surface may include a plurality of circumferentially arranged ear portions connected to the support surface by thin neck portions. Each ear portion has a radially innermost edge and a radially outermost edge, the radially innermost edge being spaced from the radially outer surface of the continuous surface portion and the radially outermost surface being spaced from the bearing axis a distance greater than the radius of the housing. Each neck portion connects a circumferential edge of the radially innermost surface of an ear portion to the radially outer surface of the continuous support surface portions The ear and neck portions are arranged so that when the bearing is mounted in the housing, the continuous support surface deforms to form a substantially circumferentially spaced series of hydrodynamic wedges.

The bearings of the present invention are designed in three dimensions to provide deflection with six degrees of freedom so as to ensure optimum wedge formation at all times. Accordingly, the support structure should be capable of supporting the bearing surface for movement in the six degrees of freedom (i.e., translation or movement in the $+x$, $-y$, $+y$, $-y$, $+z$ and $-z$ directions) and rotation about the X, Y, and Z axes so as to optimize formation of the hydrodynamic wedge. As a result of this construction, under load (i.e., friction and pressure) the continuous bearing surface deforms into a series of substantially spaced hydrodynamic wedges. Each wedge corresponds to and is supported by one section of the support structure. Although the wedges have no true leading edge and trailing edge (because the surface is continuous) they are shaped to achieve functional leading edges and trailing edges. Typically, a hydrodynamic bearing operates most effectively when the hydrodynamic wedge has several characteristics. Specifically, the wedge should extend across the entire pad surface; the wedge should have an appropriate thickness at all times; the wedge should be shaped so as to minimize fluid leakage; the wedge should accommodate misalignment such that the major axis of the bearing is colinear or substantially parallel to the axis of the shaft; and the wedge should be formed at the lowest speed possible to prevent damage to the wedge forming surface which generally occurs as a result of shaft to pad surface contact at low speeds. Moreover, with thrust bearings, the loading among the spaced bearing pads should be equal.

With regard to thickness of the fluid film, it should be understood that the optimum thickness varies with loading. Under high or heavy loading, a relatively thick fluid film is desirable to adequately support the load. However, thicker films increase friction and power loss. Thus, the bearings are preferably designed to provide the minimum thickness necessary to support the shaft at maximum load. This is one reason why the "optimum wedge" characteristics depend upon the specific bearing application.

The bearings may include an additional support structure which is preferably unitary and comprises support stubs, beams, and/or membranes connected to a housing which is sometimes defined by the radially outermost portion of the bearing in the case of a journal bearing or, in the case of thrust bearings, a housing into which the bearing is mounted.

The inventor has discovered that in many specific applications such as in high speed applications, it is necessary to examine and evaluate the dynamic flexibility of the entire system consisting of the shaft or rotor, the hydrodynamic lubricating film and the bearing. In computer analysis of this system using a finite element model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the support members and additional support structure defined by the bores, slits or cuts and grooves formed in the bearing. The shape of the support members has been found to be particularly important. Also by providing a fluid backing to the flexible members, a high degree of damping may be achieved that further adds to system stability. In some instances, this damping has replaced secondary squeeze film dampening that is present when the oil film is present between the casing of the bearing and the housing.

In some cases, it has been found that bearings which are designed based upon simulated operating conditions do not operate optimally under actual operating conditions. Accordingly, there is a need for a bearing which can be adjusted in response to sensed operating conditions.

The present invention further relates to hydrodynamic bearings in which the support structure includes one or more piezoelectric elements in the interstices within the bearing support structure and between the support structure and the bearing pad. The provision of piezoelectric elements in this manner makes it possible to actively control or adjust pad shape and orientation and to affect the deflection characteristics of the support structure. This can be done by supplying a precise amount of current to appropriately located piezoelectric elements to change the wedge shape or pad surface to minimize friction, maximize load carrying ability, alter stiffness or damping of the support structure to eliminate resonance and shaft whirl, i.e., optimize bearing performance by fine tuning the pad and support structure in response to actual operating conditions.

In accordance with another aspect of the present invention, the current supplied to each piezoelectric element can be controlled by a central processing unit (CPU) in response to sensed conditions to optimize wedge formation. The wedge can be selected to carry maximum load or to provide minimum power loss etc. More specifically, the CPU can receive signals from sensors capable of sensing physical characteristics such as temperature, shaft to pad contact, noise, friction in terms of power consumption (i.e. amp draw) which are indicative of wedge quality. The CPU processes these signals and controls the supply of current to each of the piezoelectric elements so as to improve wedge quality or maintain wedge quality if it is found to be in a satisfactory range Alternatively, the CPU can provide current to the piezoelectric elements in response to manually input instructions for specific deformations or deflections. For example, an operator could input a command to "INCREASE RIGIDITY" or "INCREASE WEDGE HEIGHT" and the CPU would supply current to the appropriate piezoelectric elements to achieve the desired result.

Wedge quality can also be varied mechanically by a jacking screw or hydraulic fluid for physically altering the deflection characteristics of the bearing support structure. Both of these systems could be electrically controlled in response to sensed conditions or manually input signals. Presently, it is believed that piezoelectric elements are the most effective way of altering bearing characteristics in response to sensed conditions or otherwise.

The bearings of the present invention are useful in many applications. Specific applications of the continuous support surface bearings of the present invention include: compressors, turbines/expanders, turbochargers, electric motors, gear boxes, air conditioners, refrigerator equipment, pumps, mixers, drilling motors, superchargers, fans, disk drives and rollers.

Unlike prior pad type bearings which have a support structure that is essentially oriented in the direction of load, the present invention provides an orientation that allows for comparable deflections within a smaller envelope (i.e., the difference between the radially inner journal surface and the radially outer journal surface in journal bearings) especially in journal bearings; allows for movement of the bearing surface in any direction (i.e., six degrees of freedom) to form a converging wedge shape; allows for the surface itself to change shape (e.g., flatten) to improve performance; allows for development of a membrane damping system for improved stability; and allows the bearings to compensate for misalignment of the supported part or shaft and to equalize loading among the bearing pads in a thrust bearing. All of these characteristics contribute to formation of an optimum hydrodynamic wedge.

While numerous arrangements of supplemental or additional support structures can be defined by providing bores, grooves, cuts, or slits in the cylindrical journal, there are primarily two modes of deflections, namely one or more ligaments or membranes which deflect in the general direction of load in a bending mode and secondly by torsional deflection in a beam or membrane in a direction extending away from the pad along the longitudinal axis of the shaft in journal bearings. The degree of deflection in the bending mode is, in part, a function of the stiffness of the support structure in the radial direction. The bearing surface itself may be made to deflect under a load to form a different shape by providing internal cuts beneath the surface or by undercutting the edges of the surface. In either case the cuts are specifically made to result in a predetermined shape under load. By surrounding or backing certain ligaments or membranes with lubricating fluid, a damping element may be added to the design.

Similar cuts are used for journal bearings and thrust bearings. The primary determinant is the deflections desired for optimum performance. However, since journal and thrust bearings perform significantly differently functions there are inherent differences in desired performance requiring different desired deflections Consequently, despite the general conceptual similarity between the journal bearings and thrust bearings of the present invention there are also significant conceptual differences and plainly evident structural dissimilarities.

The bearing of the present invention includes a continuous bearing support structure that may change shape and move in any direction (i.e., is supported for movement with six degrees of freedom). The bearing also may have a built-in damping system and is preferably of unitary or single piece construction for high volume economical manufacture. The journal bearings of the present invention also fits in a relatively small envelope (i.e., spacing between the housing outer diameter and the pad inner diameter).

In the bearings of the present invention, the bearing surface may be supported so as to allow the surfaces to adjust for misalignment of the shaft and unequal loading among pads. This is primarily accomplished through modifications in the support structures and the additional support portions.

The present invention applies to any radial, thrust or combined radial and thrust form of bearing and may be one or two directional in nature, depending on the configuration of the bearing. More specifically, if the bearing support structure is symmetrical about the bearing's major axis, the bearing will be bidirectional, i.e., capable of supporting a shaft for rotation in two directions in an identical fashion. However, if the bearing support structure is non-symmetrical about the bearing's major axis, the bearing will deflect differently when supporting a shaft for rotation in a first direction a compared to rotation in the opposite direction. For both journal or radial bearings and thrust bearings, the major axis is the central axis of the cylindrical blank from which the bearing is formed.

In accordance with another important aspect of the bearings of the present invention, the bearing surface can be supported for deflection so as to retain the hydrodynamic fluid, thus obviating the problem of fluid leakage. With respect to radial or journal bearings, the support structure is designed such that, under load, the bearing pad deflects to form a fluid retaining pocket. Generally, such a support is achieved when the bearing surface is supported proximate the axial edges of the bearing pad and the center of the bearing surface is not directly supported, i.e., is free to deflect radially outward. With respect to thrust bearings, the surface is supported so as to tilt toward the bearing's inner diameter under load so as to prevent centrifugal leakage. Generally, this is achieved when the support surface is supported at a point which is located closer to the bearing outer diameter than to the bearing inner diameter. As discussed below, piezoelectric elements may be used to enhance or provide fluid retaining deformation.

The bearings may be formed of metals, powdered metals, plastics, ceramics or composites. When manufactured in small quantities, the bearings are typically machined by facing, turning, and milling the blanks to form larger grooves or openings; smaller grooves are formed by water-jet cutting, electrical discharge or laser machining methods and allow total design flexibility to tune the bearing to provide desired characteristics. Tuning will essentially change the stiffness that in turn eliminates vibration. Manufacture of larger quantities of a single type bearing is preferably accomplished through injection molding, extrusion, powdered metal die casting, investment casting or some similar manufacturing technique. In accordance with one aspect of the present invention, intermediate quantities of bearings are manufactured according to a novel method combining machining and investment casting techniques. The present invention also contemplates easily moldable bearings which include no hidden openings such that they can be molded in a simple two-piece mold. In general, the bearings of the present invention can be manufactured at a fraction of the cost of competitive bearings.

A number of methods of manufacturing the bearings of the present invention are also contemplated. The selection of a particular method of manufacturing depends largely on the volume of the particular bearing to be manufactured and the materials used. In low volume applications, or when it is desired to produce prototypes for testing and/or production of molds or the like, the bearings are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting. In intermediate volumes, the bearings of the present invention are preferably manufactured using an investment casting method in accordance with the present invention. In high volume applications, the bearings of the present invention can be manufactured using a wide variety of materials such as plastics, ceramics, powdered and non-powdered metals, and composites. In high volume applications, a number of manufacturing methods including injection molding, casting, powdered metal, die casting, and extrusion can be economically employed The bearings of the present invention can be formed in a shape which is easily moldable.

BRIEF DESCRIPTION OF THE DRAWINGS

FIGS. 12(A) and 12(B) are bottom and cross-sectional views of another thrust bearing according to the present invention.

FIGS. 13(A) and 13(B) are bottom and cross-sectional views of another thrust bearing according to the present invention.

FIGS. 14(A) and 14(B) are bottom and cross-sectional views of another thrust bearing according to the present invention.

FIG. 15 is a cross-sectional view of another thrust bearing according to the present invention.

FIG. 16 is a cross-sectional view of another thrust bearing according to the present invention.

DETAILED DESCRIPTION

Figure 1A:
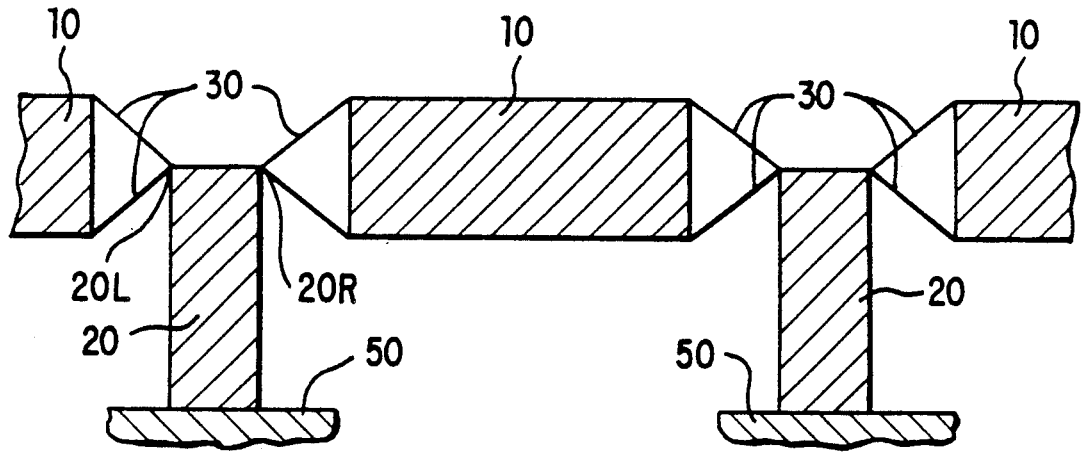
FIGS. 1(A)-1(C) are schematic views of an idealized system embodying the concepts of the present invention.
Figure 1B:
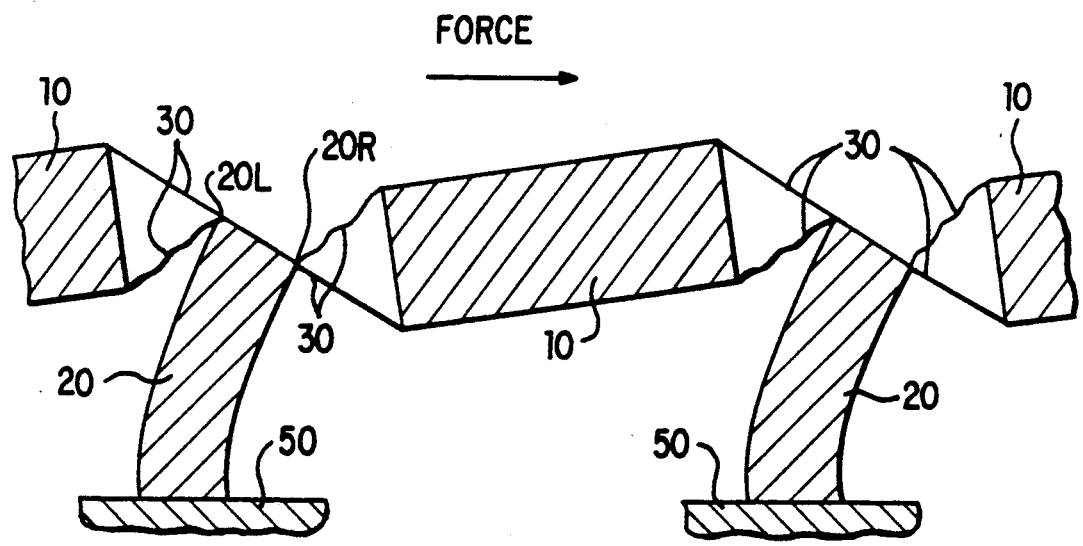
Figure 1C:
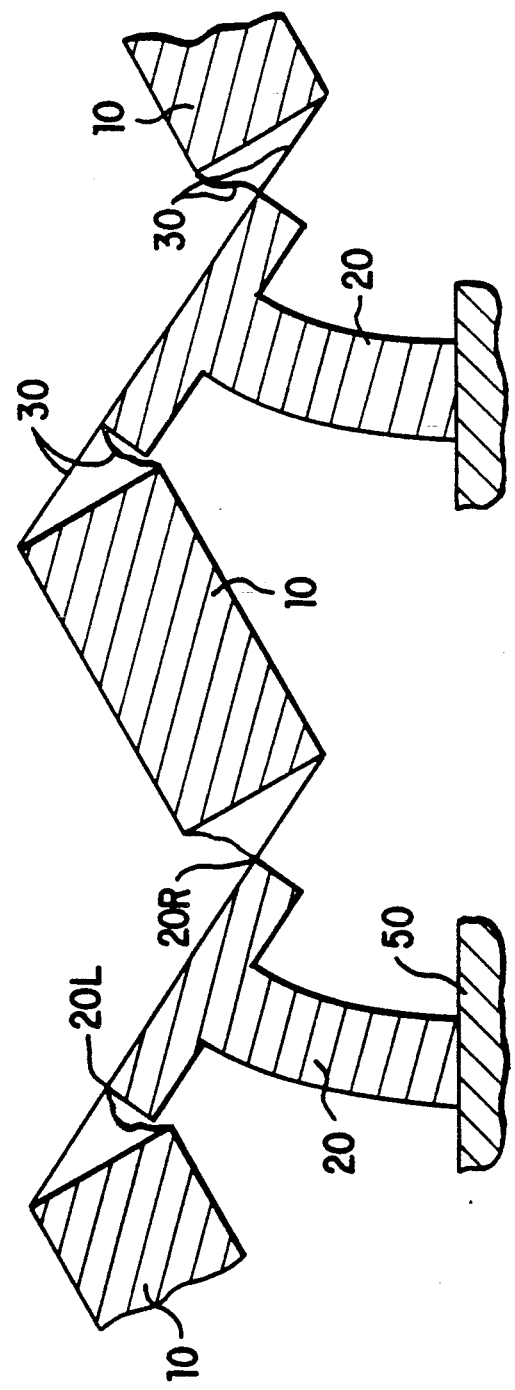

FIGS. 1A-1C illustrate the operating principles of the continuous inner diameter bearing. Specifically, as shown in FIG. 1A the bearing is based, in principle, on a system which includes a series of fully rigid support blocks 10 which are rigid in both the vertical direction V and the horizontal direction H; a series of partially, i.e., vertically, rigid support blocks 20 each spaced between two fully rigid blocks 10 and a series of supports 30 which are incapable of resisting a moment. The supports 30 may be conceptually thought of as strings which connect the corners of the fully rigid support blocks 10 to the corners of the particularly rigid support 20 as shown in FIG. 1.

FIG. 1A depicts one section S of a repeating support structure. Each section includes a fully rigid load support block 10, a partially rigid vertical support 20 and connecting portions 30 which are incapable of resisting a moment. The connecting portions 30 extend between the fully rigid load support block 10 and the vertical support 20 of each section and between the vertical support 20 of each section and the fully rigid load support block 10 of an adjacent section.

Since bearings, whether radial, thrust or combined radial and thrust generally include a continuous, i.e., circular, support network, the sections of any bearing employing this invention would also generally be connected in a continuous fashion, i.e., the end of the last section would be connected to the beginning of the first section so as to provide a continuous support network.

Viewed as an idealized static support structure, the fully rigid load supporting block 10 acts as an infinitely rigid pad portion, the vertical support 20 acts as a cantilever support and the connecting portions 30 act as strings having no ability to resist moment. Thus, when as shown in FIG. 1B, a force F as applied to this system, the vertical support deflects in a cantilever fashion. (The deflections depicted throughout the drawings are greatly exaggerated). Further, because the connecting portions 30 are incapable of resisting moment and because the support block 10 is fully rigid, i.e., incapable of deflection, the cantilever deflection of the vertical supports 20 causes the rigid blocks 10 to tilt in the manner shown in FIG. 1B. As further illustrated in FIG. 1B, the deflection of the static system causes some of the string-like connecting portions to go slack while the other string-like connecting portions are taut. Thus, while the connecting portions 30 are incapable of resisting a moment, they can cause deflection of the blocks 10 because they have a substantially fixed length, i.e., they are inelastic.

The amount of tilting of the blocks 10 depends on the difference in elevation between the top corners of the vertical support 20. In particular, when as shown in FIG. 1A, the upper left corner 20L and the upper right corner 20R of the vertical support are at the same horizontal level, the system is in equilibrium and the blocks 10 are level. However, when as a result of the cantilever deflection of the vertical support 20, the upper left corner 20L deflects to a position above the upper right hand corner 20R of the vertical support 20R of the vertical support and the system is forced into an equilibrium in which the blocks 10 are tilted as a result of the inelasticity of the connecting portions 30 and the rigidity of the block 10.

Since the degree of tilting of the block 10 depends on the difference in height between the upper corners of the vertical support, the amount of tilting could be increased by increasing the flexibility of the vertical support in the horizontal direction. However, this presents a number of problems and there are limits to the amount of flexibility of the vertical support member. A better way of increasing the degree of tilting of the block 10 is to increase the space between the upper left corner 20L and the upper right corner 20R of the vertical support member such that, for each angle of deflection of the support 20, a greater horizontal spacing between the upper left corner 20L and the upper right corner 20R is achieved. Of course, if the vertical support 20 were simply made wider so as to increase the space in between the upper left corner 20L and the upper right corner 20R the vertical support 20 would become more horizontally rigid and therefore undergo less cantilever deflection under load.

The optimum solution is to provide a T-shaped vertical support such as that shown in FIG. 1C. Because the top of the vertical support corresponding to the cross-bar of the T is lengthened, the elevational difference per angle deflection is significantly increased. Yet, because the vertical support corresponding to the lower portion of the T is still relatively thin, the vertical support can deflect or cantilever adequately. As illustrated in FIG. 1C, the use of a T-shaped vertical support dramatically increases the tilt angle of the support block for a roughly equivalent amount of deflection of the vertical support 20.

Figure 2A:
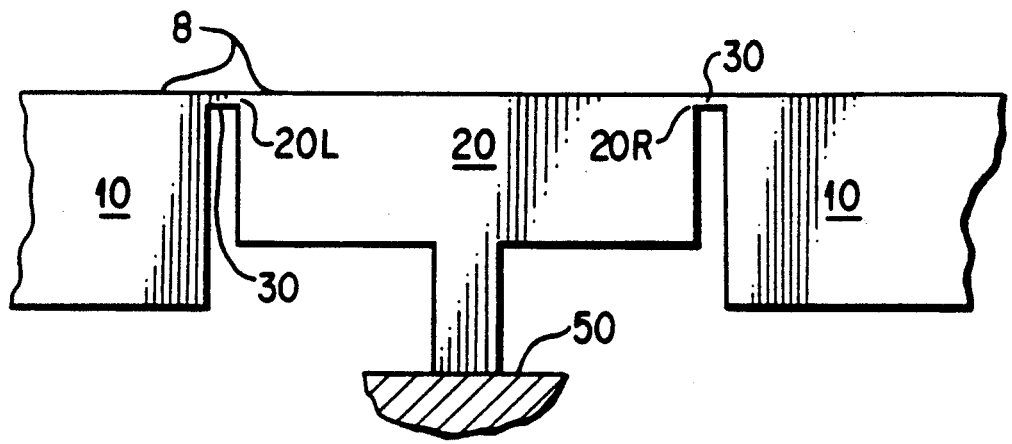
FIGS. 2(A)-2(B) are sectional views of a bearing system according to the present invention.
Figure 2B:
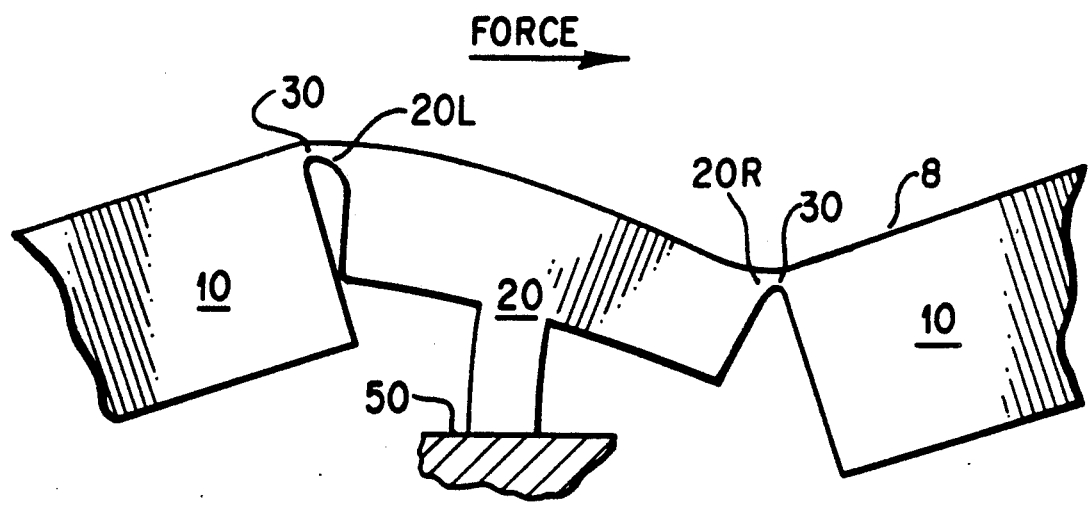

FIGS. 2A and 2B illustrate, conceptually, the application of the aforementioned principles to a bearing having a continuous bearing face. Specifically, these drawings show one section of a bearing constructed of a series of identical sections connected to one another in a continuous fashion. The bearing includes a continuous bearing surface 8 and a support structure which includes a series of identical sections. Each section includes a fully rigid load supporting section 10, a vertically (partially) rigid T-shaped vertical support section 20 and connecting sections 30 between the rigid sections 10 and the T-shaped sections 20.

Unlike the string discussed above, the connecting sections 30 have a small ability to resist moment; however, the sections are made as thin as possible to substantially reduce their moment resisting ability. As the connecting portions 30 are made thinner, their ability to resist moment is reduced and the structure operates likes the conceptual system described above and illustrated in FIGS. 1A–1C. Of course, the connecting portions 30 must be thick enough to avoid fatigue failure, or some other failure under load.

If the cross-member of the T-shaped portion significantly cantilevers, the advantages achieved by providing the cross-member, namely, increased differential and horizontal spacing between the upper left corner 20L and the upper right corner 20R per angle deflection of the vertical support 20 are negated. Accordingly, another important design consideration is that the horizontal cross-member of the T-shaped portion 20 should be relatively rigid in the vertical direction so that this portion does not significantly cantilever under load.

FIG. 2A depicts the bearing structure in an unloaded state. In this state, the continuous bearing surface is flat. FIG. 2B depicts the deflection (greatly exaggerated) of the support structure and consequent deformation of the support surface 8 when a load is applied across the bearing surface 8. In particular, as shown in FIG. 2B, the vertical support beam deflects or cantilevers such that the upper left corner 20L assumes a position substantially above the upper right corner 20R. As mentioned before, the cross-member should be relatively rigid otherwise the T-member would deflect in an umbrella type double cantilever fashion thereby lessening the degree of horizontal elevation of the left corner 20L with respect to the right corner 20R. The support structure assumes the equilibrium position shown in FIG. 2B as a consequence of the deflection of the T-shaped member 20 (which yields the high differential between the left corner 20L and the right corner 20R) and because of the extremely limited moment resisting capability of the connecting portions 30 and the almost total absence of deflection of the fully rigid members 10. In this position, the continuous bearing surface is deformed into a circumferentially spaced series of a wedge shaped surface features. If the support structure is designed so as to deflect properly, the wedge shaped features correspond to an optimal hydrodynamic wedge so that as the shaft to be supported rotates, it is supported by fluid which is pressurized by the hydrodynamic wedge between the shaft surface and the continuous bearing surface.

Although specific reference is made to either journal bearings or thrust bearings to facilitate an understanding of this invention, some of the same principles of bearing design apply regardless of the specific form of bearing being designed. For example, both types of bearings operate on the principle of formation of a hydrodynamic wedge. Further, the major axis of both journal bearings and thrust bearings is the central axis of the cylindrical blank from which the bearing is formed. Accordingly, if either a thrust bearing or a journal bearing is symmetrical about this axis, i.e., the major axis, the bearing will be bidirectional.

There are significant differences between thrust bearings and journal or radial bearings. The most prominent difference is, of course, the portion of the shaft supported and consequently the orientation and/or attitude of the bearing pad support surface. Specifically journal or radial bearings support circumferential portions of shafts; thrust bearings support shoulder or axial end portions of shafts. Other differences follow from this fundamental difference. For example, in a radial or journal bearing the load is applied unevenly across the pad support surface; the mass of the shaft is applied to the lowermost portion of the pad support surface. In a thrust bearing, load is substantially evenly distributed across the entire pad support surface. Moreover, a journal bearing generally has a built-in wedge due to differences in the shaft and bearing diameters; conversely, there is no such built-in wedge in thrust bearings. Additionally, while a journal or radial bearing controls rotational stability as well as load; a thrust bearing typically only carries load. It should also be understood that the design of journal bearings, particularly hydrodynamic journal bearings, is significantly more complicated than the design of thrust bearings. In part, this is because of the constraints imposed by the need to limit the radial envelope of the journal bearings. Nevertheless, as is evident from this disclosure, many of the principles discussed herein are applicable to either thrust or journal bearings.

In describing the bearings of the present invention in an understandable way, it is helpful to describe the bearing structures as being formed from a cylindrical blank by providing grooves, slits, bores and other openings in the cylindrical blank. As noted below, this is sometimes a useful technique for manufacturing a prototype bearing. However, the reference to the cylindrical blank is primarily intended to assist understanding of the present invention. It should be noted that although many of the bearings of the present invention could be manufactured from a cylindrical blank, it is not necessary that any of them be so manufactured. Indeed the bearings can be manufactured in numerous ways, some of which are discussed hereinafter.

Figure 3:
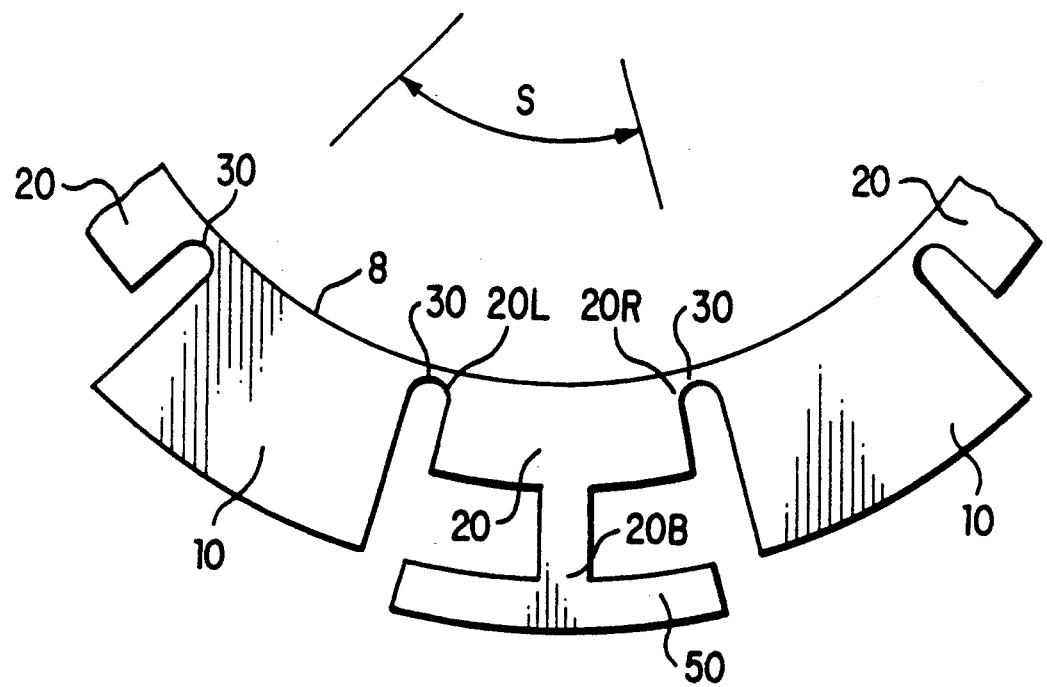
FIG. 3 is a side view of a section of a radial bearing according to the present invention.

The structure depicted in FIG. 3 is a sector of a journal bearing assembly having grooves, slits, and openings formed therein so as to define a continuous bearing pad surface 8 which is supported by a support structure which includes the housing, a plurality of circumferentially spaced fully rigid portions 10, an equal number of partially rigid generally T-shaped portions 20 interposed between the fully rigid portions 10, and a plurality of connection portions 30 connecting the fully rigid portions to the generally T-shaped portions. The bearing defined by the grooves and slits is symmetrical about the central axis 7 of the cylindrical blank from which the bearing is formed, i.e., the bearing's major axis. Accordingly, the bearing illustrated is a radial bidirectional bearing, i.e., it is adapted for radially supporting a shaft for rotation in two directions. In the illustrated embodiment, the bearing supports the shaft 5 for rotation in either the counter-clockwise or the clockwise direction. On the other hand, if the bearing were non-symmetrical about the major axis 7, it would be capable of supporting the shaft 5 only for clockwise or counter clockwise rotation, not for both.

FIG. 3 depicts a representative section of a radial bearing having a continuous bearing surface 8 and constructed with a support structure which functions along the previously described lines. The radial bearing includes a continuous bearing support surface 8 and a support structure which includes a plurality of identical sections. Each section includes a fully rigid member 10, a T-shaped vertical support member 20 and connecting portions 30 connecting the rigid member 10 to the T-shaped member 20 and connecting the T-shaped member 20 to the rigid member 10 of an adjacent section. In FIG. 3, one complete section is shown as section S; the radial bearing shown would include six such sections.

The bearing depicted in FIG. 3 is preferably of a unitary construction and can be formed from a cylindrical blank by providing cuts and grooves in the cylindrical blank to define the necessary portions. Naturally, the dimensions of the specific portions depend upon the intended use; nevertheless, certain general rules apply. First, the fully rigid portion 10 must be relatively wide and thick to ensure its rigidity. Second, the cut or groove which defines the connecting portion 30 should be relatively deep to provide the smallest thickness possible without failure so as to substantially reduce the ability of the connecting portion 30 to resist moment. Third, the base 20B of the T-shaped vertical support member 20 should be the only member of the support structure which is fixed to the housing or some other member to ensure the rigidity of the member 20 in the vertical direction. Fourth, the cross-members of the T-shaped vertical support 20 should be relatively rigid in the vertical direction to ensure that they do not significantly cantilever in response to the applied force. Fifth, the vertically extending member of the T-shaped portion should have a sufficiently small section modulus to ensure that it cantilevers in response to the applied force. Generally, the section modulus of the vertically extending member can be lessened i.e., made to cantilever more easily, by either extending its length relative to its width or by reducing its width by providing facing cuts or grooves so that it is thinner in the direction of the paper. Since the base 20B of the T-shaped vertical support member 20 is relatively small in cross-section, it is generally convenient to provide an additional support member 50 to support the member 20 on the housing. In some cases, this additional support number 50 can be a solid member so that the deflections of the support structure 10, 20 and 30 alone control the deflection of the bearing. However, the additional support member 50 can also be designed so as to deflect under load to alter the deflection characteristics of the bearing. This may be particularly useful to accommodate shaft misalignment. For instance, the additional support portion can be formed so as to support the base 20B of the vertical support member 20 on a membrane such that the entire support structure 10, 20, 30 can be adjusted. Various constructions for the additional support portion 50 are discussed above and illustrated in FIGS. 5–7 and 10–17.

Figure 4:
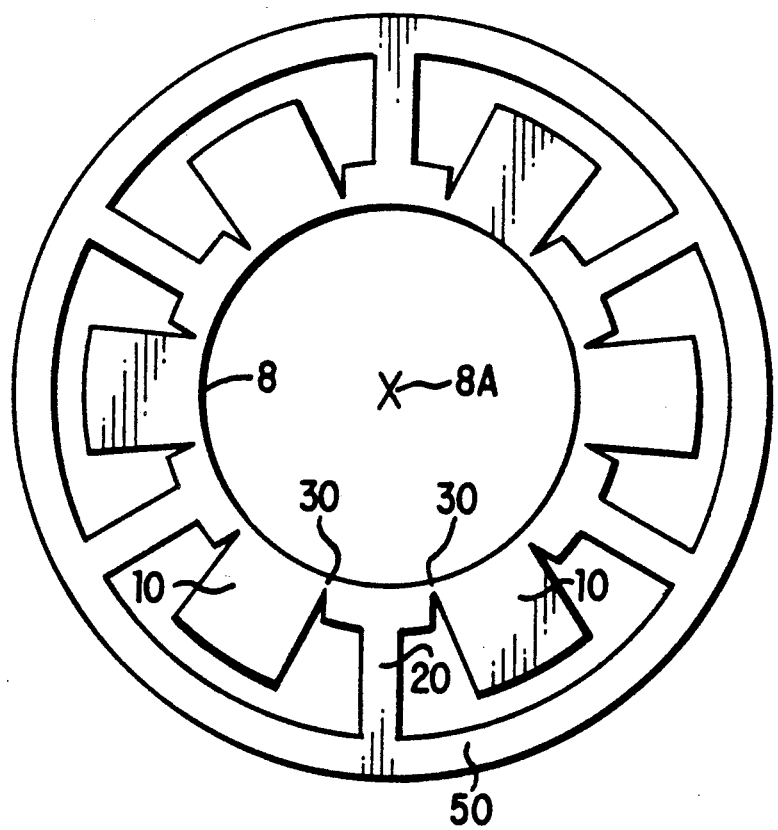
FIG. 4 is a side view of another radial bearing according to the present invention.

FIG. 4 depicts a radial bearing construction similar to that shown in FIG. 3. Like the bearing shown in FIG. 3, this bearing includes a continuous bearing surface 8, a support structure which includes a series of identical sections, each of which include a fully rigid member 10, a connecting portions 30 having a substantially reduced ability to resist moment and a T-shaped vertical support portion 20 and an additional connecting portion 30 connecting the T-shaped vertical portion to the rigid member of an adjacent.

FIG. 4 also illustrates how the repeating series of sections can be connected in a continuous fashion so as to define a generally cylindrical continuous bearing surface 8. The bearing shown in FIG. 4 also includes an additional support portion 50. In this instance, the additional support portion 50 is a continuous element. As discussed before, this additional support portion 50 can be modified in many ways to alter the overall deflection characteristics of the bearing. For example, if the additional support portion 50 supports the T-shaped vertical support member 20 on a continuous membrane, the axis 8A of the continuous cylindrical bearing surface 8 can be adjusted so as to accommodate misalignment with the axis of the shaft to be supported. This is because the additional support portion 50 allows movement of the base portion 20B of the T-shaped vertical support member toward and away from the axis 8A. Various constructions for the additional support portion 50 are discussed below.

Like the bearing illustrated in FIG. 3, the bearing depicted in FIG. 4 can be manufactured according to many techniques. The bearing is generally a unitary element. Prototypes and small quantity items can be manufactured from a cylindrical bore which is machined to provide cuts, grooves and openings to define the required elements in the bearing construction. In larger quantities, bearings such as the one shown in FIG. 4 can be formed by extrusion or molding as discussed below.

FIGS. 5A and 5B and FIGS. 6A and 6B depict other journal bearing constructions according to the present invention. Like the previously described construction, the bearing includes a continuous support surface 8 and a support structure which includes a series of identical sections. Again, each section includes a fully rigid member 10, a T-shaped vertical support member 20 and connecting portions 30. The basic construction of the support structure discussed above is created by the use of small slits or cuts through the wall. Typically these slits or radial cuts are between 0.002 to 0.125" wide. The degree of deflection can be varied by varying, among other things, the length of the cuts. Longer cuts provide a longer moment arm which yields greater deflection. Shorter cuts yield beams having less flexibility and higher load carry ability. In selecting a length of cut or slit, care must be taken to avoid resonance.

By locating the cuts and slits as shown in FIGS. 5A and 5B and FIGS. 6A and 6B, the support structure deflects in the previously described manner. As a result of this deflection, the gap between the pad surface 8 and the outer surface of the shaft, through which fluid flows, deforms into a series of wedge shapes which yield the well-known hydrodynamic support effect. Generally the ratio of the spacing between the trailing edge of each wedge shape and the shaft versus the spacing between the leading edge of each wedge shape and the shaft should be between 1:2 to 1:5. In other words, the spacing between the leading edge and the shaft should be between 2 to 5 times greater than the spacing between the trailing edge and the shaft. In order to attain this ideal spacing or wedge ratio for any specific application, appropriate deflection variables including number, size, location, shape and material characteristics of the unitary element must be selected. The "ideal wedge" also depends on desired performance characteristics. For example, the ideal wedge for maximizing load carrying ability is not the same as the ideal wedge for minimizing friction associated power consumption. A computer aided finite element analysis has proven to be the most efficacious means of optimizing these variables. Computer aided analysis is particularly useful in a bearing such as the type described above which permits movement in all six directions (six degrees of freedom).

In some cases, it has been observed that a bearing designed for optimal performance under simulated operating conditions does not perform optimally under actual operating conditions. The bearings of the present invention can be adjusted in response to sensed operating conditions to correct any operating deficiencies. More specifically, the bearings of the present invention can include separate elements for physically altering the wedge shape, pad surface and/or deflection characteristics of the support structure. The separate elements can be controlled by a central processing unit (CPU) which in turn receives signals indicative of wedge quality. For example, the sensors can sense physical characteristics such as temperature, shaft to pad contact, torque, noise, power consumption etc. The signals from the sensors are transmitted to the CPU and compared with conditions indicative of optimum wedge formation. When there is a significant deviation between the actual sensed conditions and the conditions indicative of optimum wedge quality, the CPU transmits a signal to the means for physically adjusting the wedge shape, pad surface and/or deflection characteristics of the support structure to forcibly adjust the wedge to achieve optimum wedge formation. Again, the optimum wedge characteristics depend on the intended use of the bearing, e.g., high load vs. low friction. Alternatively, or in addition, the CPU can be responsive to direct, manually input, commands such as "INCREASE RIGIDITY" or "INCREASE WEDGE HEIGHT". When such a command is received, the CPU undergoes a routine predetermined to achieve the desired result.

Various means can be used to physically alter wedge quality. For example, wedge quality can be physically altered by forcing hydraulic fluid into damping chambers (discussed below) to alter the damping characteristics of the bearing support structure. Alternatively, a mechanical rod or jack screw can be brought into contact with the support structure to physically alter the deflection characteristics of the support screw. Either of these means could be electronically controlled.

Although many means could be used to physically adjust the wedge in response to sensed operating conditions, it is presently believed that the best such means is to provide one or more piezoelectric elements in the interstices within the bearing support structure or between the support structure and the bearing pad. The provision of piezoelectric elements in this manner makes it possible to actively control or adjust pad shape and orientation and to affect the deflection characteristics of the support structure. More specifically, it is known that the application of an electric current to certain crystals and ceramic materials, i.e., piezoelectric materials, can produce mechanical expansion forces. When an altering voltage is applied, the crystal or ceramic material undergoes thickness oscillations. However, when a direct current is constantly applied the change in thickness does not vary. Thus, it is known that certain, piezoelectric, materials can change dimensions when subjected to voltage. Notable among these materials are quartz, rochelle salt (potassium, sodium tartarade), properly polarized barium titanade, ammonium dihydrogen phosphate, ordinary sugar and certain ceramics. Of all the materials that exhibit the piezoelectric effect, non possesses all the desirable properties such as stability, high output, insensitivity to temperature extremes and humidity, and the ability to be formed into any desired shape. Rochelle salt provides the highest output, but requires protection from moisture and air and cannot be used above 45° C. (115° F.). Quartz is undoubtedly the most stable, yet its output is low. Because of its stability, quartz is quite commonly used for a stabilizing in electronic oscillators. The selection of a specific piezoelectric element for use in connection with the bearings of the present invention naturally involves consideration of these and other known characteristics of piezoelectric materials as well as consideration of the intended use of the bearing.

The piezoelectric elements could be located in the interstices of any of the hydrodynamic bearings of the present invention. However, the convenience of placing a piezoelectric element within the support structure or between the support structure and the bearing pad naturally depends on the spacing between the support structure and the bearing pad or within the support structure. Since the bearings described hereinafter can have a wide variety of interstitial spacing and because the actual size of the spacing depends on the size of the bearing, the selection of a bearing form from the varieties described hereinafter for use in a piezoelectrically controlled bearing depends on, among other things, the diameter of the bearing to be used.

The bearings shown in FIGS. 5A, 5B, 6A and 6B differ from the bearings of FIGS. 3 and 4 in that the additional support portion 50 is modified to provide additional flexibility in the support system.

Figure 5A:
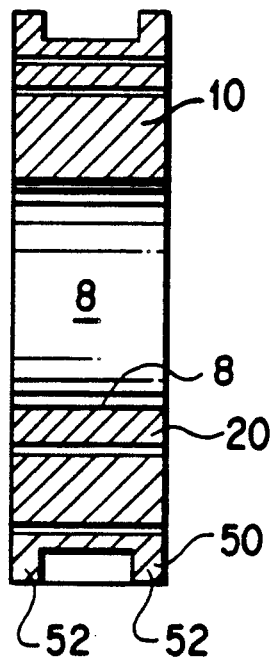
FIGS. 5(A) and 5(B) are cross-sectional and side views of another radial bearing according to the present invention.
Figure 5B:
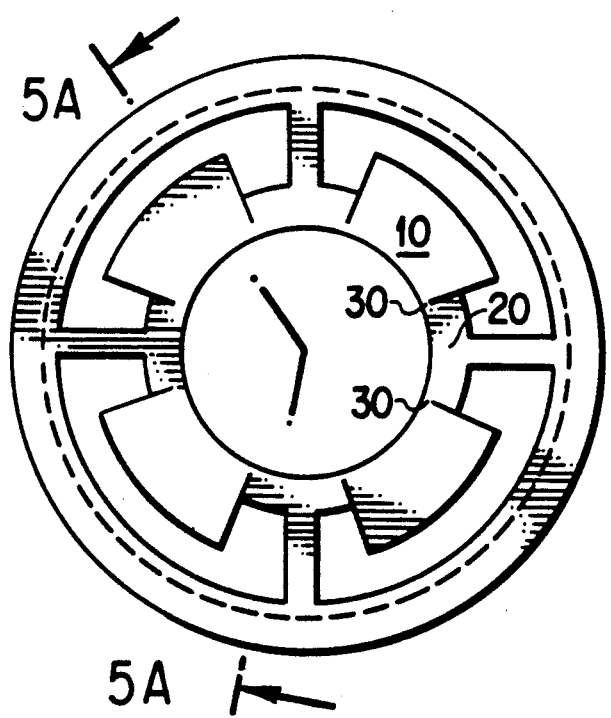

In the bearing of FIGS. 5A and 5B, a continuous membrane support for the support structure is obtained by providing a continuous peripheral groove in the outer peripheral of a radial bearing so as to undercut the additional support member 50. The membrane is supported by two continuous peripheral beams 52 disposed at the axial ends of the membrane. A similar membrane can be provided by providing an axial facing groove in the bottom of a thrust bearing or combined radial and thrust bearing. The membrane acts as a fluid damper upon which the support structure is supported in a floating manner such that the entire support structure can be adjusted to accommodate shaft misalignment. The flexibility of the membrane combined with the fluid lubricant, provides a means to vary the damping action and to isolate the pad from the housing. The damping is similar to that of a dashpot that exhibits high damping characteristics.

The additional support portion 50 is provided with cuts, grooves, slits and openings to divide the continuous membrane or continuous peripheral beams 52 into one or more discrete beams for supporting the support structure.

A membrane is defined by forming a shallow circumferential groove on the outer periphery of the bearing; the membrane thus formed is supported by a pair of continuous beam-like elements 382. The continuous membrane can be divided into a discrete support structure comprising a beam and membrane network for supporting the partially rigid members 20. This is achieved, for example, by the provision of a plurality of large symmetrically disposed bores, the provision of smaller symmetrically disposed bores, and (optionally) the provision of small non-symmetrically disposed bores. The provision of the non-symmetrically disposed bores yields a support structure is more flexible, and thus biased, in the direction of those bores.

For example, internal slits or cuts can be provided to create a beam on beam support structure. Specifically, the bearing is formed with grooves and slits or cuts to define beam which is supported from a housing by beams. The pad is connected to the beams at support stubs. Again the bearing consists of the thin cuts or slits shown cut through the bearing wall.

A cut or slit can be formed below the support surface to introduce additional flexibility such that under load the surface changes shape to form an airfoil for the introduction of lubricant. Thus, as a result of the beam on beam two point support, the pad acts as a spring like membrane.

Figure 6A:
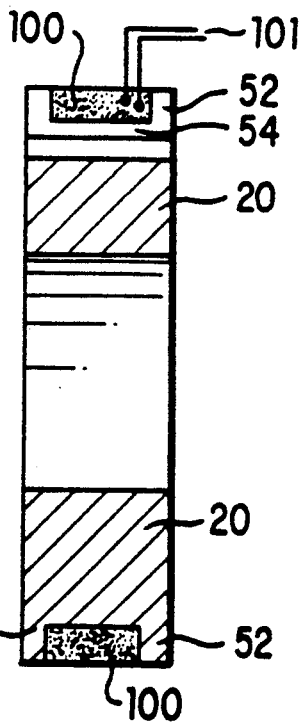
FIGS. 6(A) and 6(B) are cross-sectional and side views of another radial bearing according to the present invention.
Figure 6B:
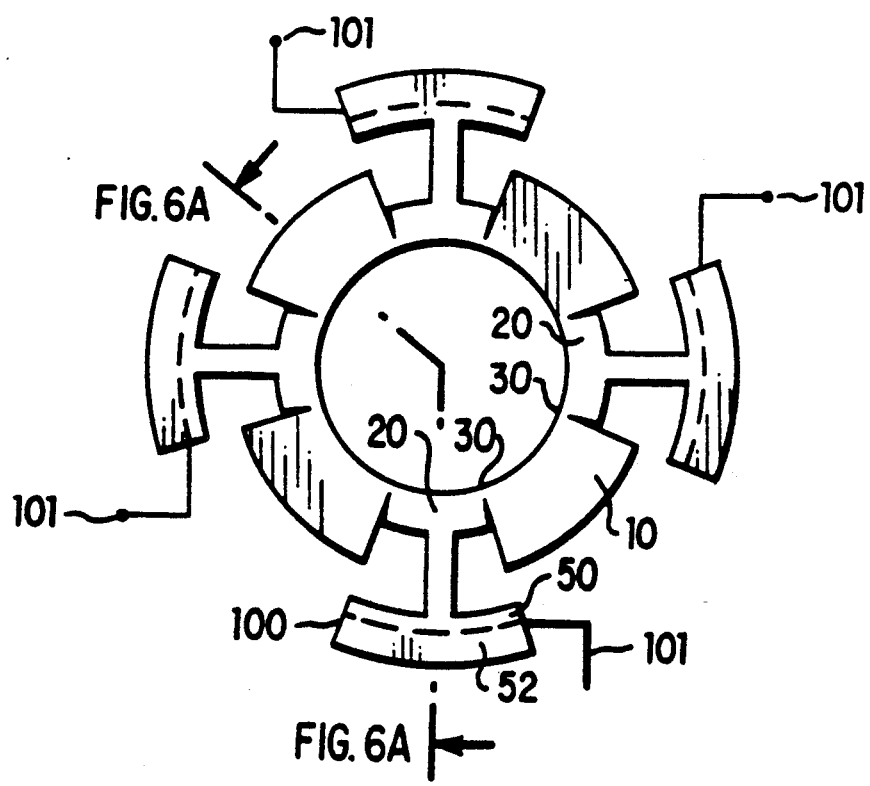

In the bearing construction of FIGS. 6(A)–6(B), the additional support portion is divided into a beam network for supporting each T-shaped partially rigid portion 20. The beam network includes a thin curved membrane-like beam 54 and peripheral beams 52. A piezoelectric element 100 is provided under each membrane. A current supply means such as wires 101 or metal strips is attached to each piezoelectric element to allow current to be supplied to the piezoelectric elements. The supply of current is controlled by a CPU or similar means to which the current supply means is connected.

Figure 7:
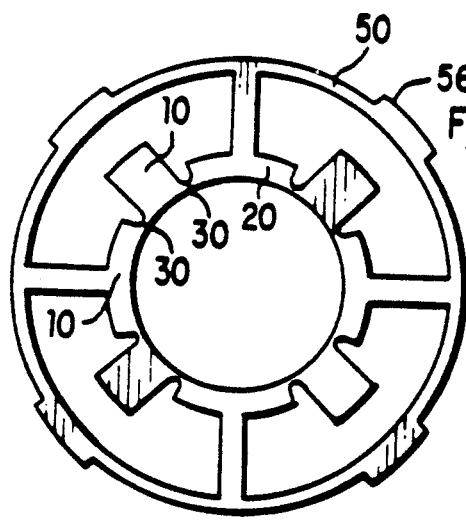
FIG. 7 is a side view of another radial bearing according to the present invention.
Figure 10A:
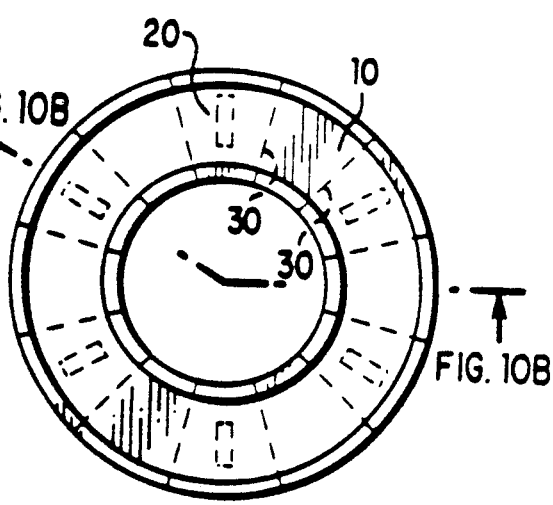
FIGS. 10(A) and 10(B) are bottom and cross-sectional views of another thrust bearing according to the present invention.
Figure 10B:
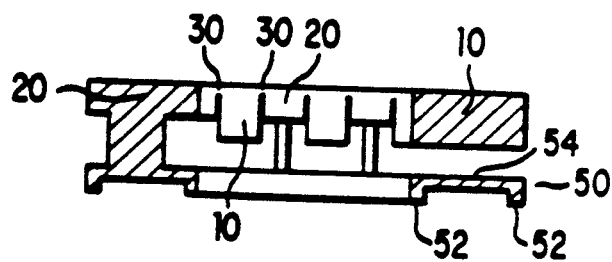

FIG. 7 illustrates another journal bearing construction according to the present invention. The bearing is formed by proportionately large grooves and like the previously described bearings includes a number of identical sections, each including a fully rigid portion 10, a partially rigid portion 20 and connecting portions 30. Because the bearing has a continuous cross-section, the bearing construction of FIG. 7 is extrudable and moldable in a simple two-piece mold, i.e., easily moldable.

The bearing of FIG. 7 further includes an additional support portion 5 which is modified to include circumferentially spaced support ribs 56. By virtue of this construction, the partially rigid portion 20 is flexibly supported without sacrificing the continuous cross section and attendant advantages. In particular, adjacent ribs 56 act as beams supporting the remainder of the additional support portion 50 in a flexible manner. Among other things, this allows the bearing to adjust for misalignment with the shaft to be supported.

The bearing constructions illustrated in FIGS. 3–4 are characterized by the fact that the support structure is defined by relatively large grooves and openings formed in a cylindrical blank. Normally, this type of construction would be formed by milling the blank rather than electrical discharge machining or some other similar technique for forming small grooves. An advantage of such bearing constructions is that in applications requiring extremely small bearings it is easier to form precisely the proportionately larger cuts and openings required to form a bearing of the type illustrated in FIGS. 3–4 as compared to the proportionately smaller cuts and openings required by the construction of, for example, FIGS. 5 and 6. Moreover, the large grooves or openings are generally easier to mold or extrude. Bearings formed by larger cuts also find use in applications requiring extremely large bearings with stiff bearing pad support structures.

Moreover, the bearings shown in FIGS. 3, 4 and 7 have continuous cross-sections with no hidden openings. Hence, they are easily extrudable and easily moldable. Naturally, the support structure can be altered, after section, e.g., by providing radially extending circumferential grooves or non-symmetrically disposed radially extending openings to alter the support structure and thereby alter the performance characteristics.

Figure 8:
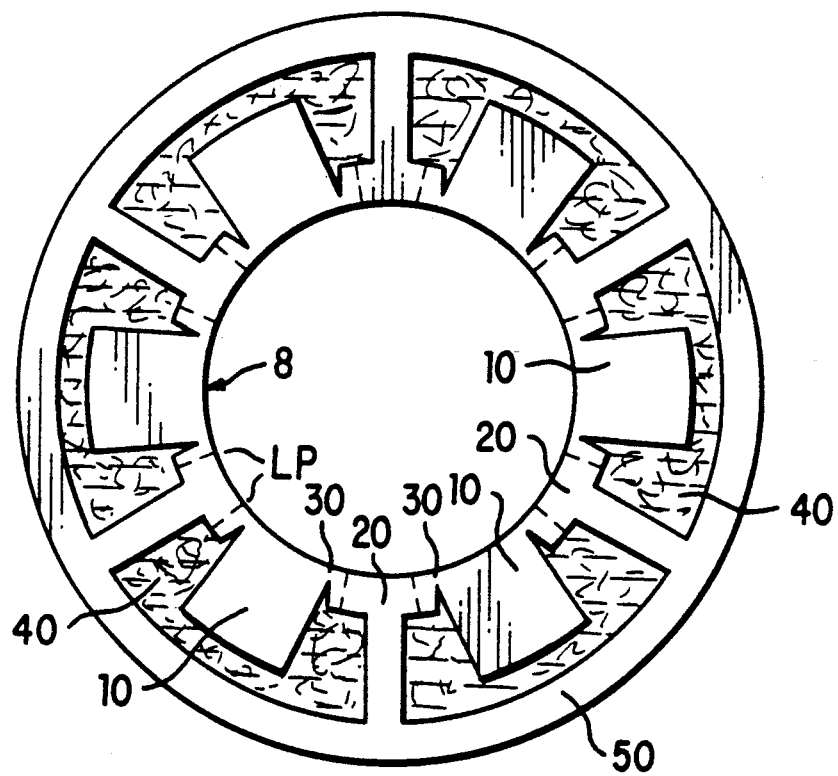
FIG. 8 is a side view of a modified radial bearing.

FIG. 8 depicts a bearing having a construction similar to the FIG. 4 but in which the openings, cuts and grooves which define the support structure are filed with a porous plastic 40 which is loaded with a lubricant. A plurality of lubricant passages 42 extend through the support structure to the continuous bearing surface 8 so as to provide communication between the porous plastic which is a source of lubricant and the bearing surface. Under loading, the porous plastic releases its lubricant through the lubricant passages 42 onto the continuous surface 8 so as to provide lubricant as required.

Figure 9A:
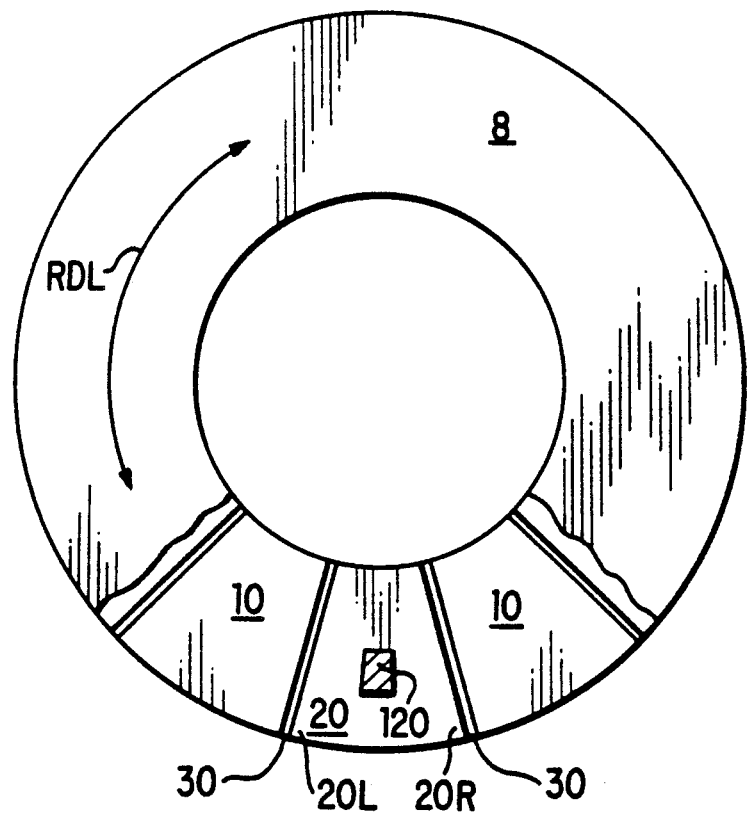
FIG. 9(A) is a top view of a thrust bearing according to the present invention.
Figure 9C:
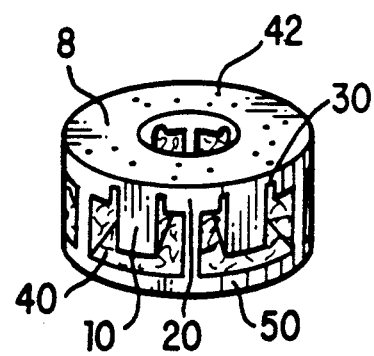
FIG. 9(C) is a perspective view of the thrust bearing of FIG. 9(A).
Figure 9B:
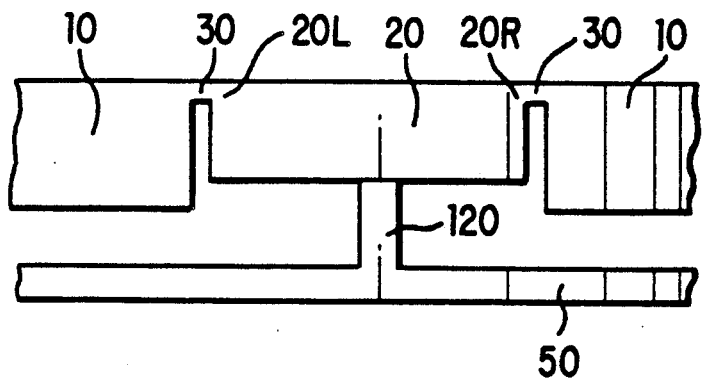
FIG. 9(B) is a flattened side view of the thrust bearing of FIG. 9(A).

FIGS. 9(A)–9(C) depict a thrust-bearing having a continuous bearing surface according to the present invention. FIG. 9(A) is a top view of the thrust-bearing showing the continuous circular and substantially planar surface 8 having a portion cut away to reveal a top view of a section of the support structure which includes a fully rigid portion 10, a connecting portion 30 connecting the rigid portion 10, a connecting portion 30 connecting the rigid portion 10 to a T-shaped vertically rigid support portion 20 and a second connecting portion of 30 connecting the T-shaped vertical support portion 20 to the rigid member 10 of an adjacent section in FIG. 9A. An additional portion of a continuous bearing surface 8 is cut away to reveal an alternative construction of the T-shaped vertical support member 20. Specifically, the vertically extending portion of the T-shaped member has a reduced section so as to increase its flexibility and enhance its ability to cantilever. Although FIG. 9A shows, for purposes of illustration, alternative constructions in the same bearing, it should be appreciated that the sections of any particular bearing should be identical.

FIG. 9B shows a somewhat schematic cross-section of the thrust-bearing of FIG. 9A. As shown in this figure, the thrust-bearing also includes an additional support portion 50 which may be formed in a number of ways, as discussed below, to alter the deflection characteristics of the bearing as a whole. Under loading, the bearing deflects in the manner discussed above.

FIG. 9C shows a perspective view of the thrust-bearing of FIG. 9A. FIG. 9C also shows that lubricant passages 42 can be provided on the continuous surface 8 of the thrust-bearing. Naturally, such passages are only provided if the openings are filled with a porous plastic loaded with lubricant (not shown).

FIGS. 9(A)-9(C) illustrate a unitary hydrodynamic thrust bearing in accordance with the present invention. As noted earlier, thrust bearings in accordance with the present invention incorporate some of the same features as journal bearings in accordance with the invention. For instance, like journal bearings, the thrust bearings of the present invention have a major axis defined as the central axis of the blank from which the bearing is formed. When the thrust bearing is symmetrical about its major axis it is bidirectional; when the bearing is non-symmetrical about its major axis, it is unidirectional. However, by nature of their different function, the thrust bearings have a slightly different configuration.

FIG. 9(A) shows the radial dividing line RDL of the bearing support surface. The bearing support surface lies in a plane which is essentially transverse to the axis of the shaft to be supported and the bearing's major axis. Of course, when the support surface deforms under load, or if it is desired that the bearing be skewed slightly so as to contact the shaft in the installed or static state, the support surface of the bearing may be somewhat nonplanar and somewhat skewed with respect to the major axis or the axis of the shaft to be supported.

A particularly important consideration in the design of thrust bearings of the present invention is the prevention of fluid leakage. By virtue of the continuous bearing surface construction, the bearings of the present invention provide exceptional fluid leakage control. To a large extent this objective is achieved by designing the support structures such that under load the inner edge of the support surface deflects downward (as viewed in FIG. 9(A)) and the outer edge deflects upwardly. Any of the thrust bearings described herein can be designed in this manner. For instance, in the bearing shown in FIG. 9, the partially rigid members can be undercut so as to be joined to the pad surface 8 at a point which is closer to the outer peripheral edge of the continuous bearing pad. Thus, the center of the support for the support surface is located radially outward of the radial dividing line RDL shown in FIG. 9(A). Hence, the bearing is designed such that, under load, the inner edge of the bearing deflects downward. In operation, the downward deflection of the inner edge of the bearing pad corresponds to deflection away from the shaft supported and the upward deflection of the outer edge of the bearing surface corresponds to deflection toward the shaft. The deflected orientation of the bearing pad significantly inhibits the loss of fluid which otherwise occurs as a result of centrifugal forces action on the fluid. In addition, or alternatively, the pads can be forcibly deformed by separate elements, such as piezoelectric elements, to assist in fluid retention.

The bearing support surface is supported by a support structure (described above). The support structure may be supported by an additional support portion 50. The support portion could include beam or membrane supported by a support member such as pair of continuous beam-like legs 52.

By providing holes or openings in the beam or membrane portion, the continuous membrane becomes a set of beams. Alternatively, the continuous inner beam-like leg could be replaced with a plurality of short stub-like beams or even eliminated to define a support such that the support structure is supported in a cantilever fashion. Finally, when the holes and openings are symmetrically disposed with respect to the major axis the bearing is symmetrical about the major axis and is therefore bidirectional.

The holes or openings which divide the continuous membrane into separate beams can be round to facilitate manufacture of the bearing prototype (circular openings can easily be drilled into the bearing material). This is true of all the bearings described herein.

Although the shape of the beam members may be dictated by manufacturing convenience, the shape also affects the performance of the individual bearings. Thus, although the specific shape of the bearings described herein, is primarily attributable to the ease of manufacturing a prototype, it is also believed to yield excellent results for a specific application. Any changes in the shape would, of course, influence the performance characteristics of the bearing by, for example, altering the bending or twisting characteristics of the beams which support the bearing pad. Thus, while other shapes of beams, pads and membranes are certainly contemplated, both the ease of manufacturing and the effect of the beam pad or membrane's shape on bearing performance must be considered.

Examples of other thrust bearing shapes are shown in an FIGS. 10-16. Each of these figures includes a bottom view (A) and a sectional view (B) (since the support surface B is always continuous and thrust bearings have surface constructions of the type shown in FIGS. 9(A) and 9(C)). The difference between these bearings and the bearing construction shown in FIGS. 9(A)-9(C) primarily resides in different constructions of the lower portion of the partially rigid-shaped portion 20. Although not shown, any of the thrust bearings of this invention could be modified, as discussed above, by providing openings, cuts or grooves in the additional support portion to define various beam and/or membrane supports.

Figure 11A:
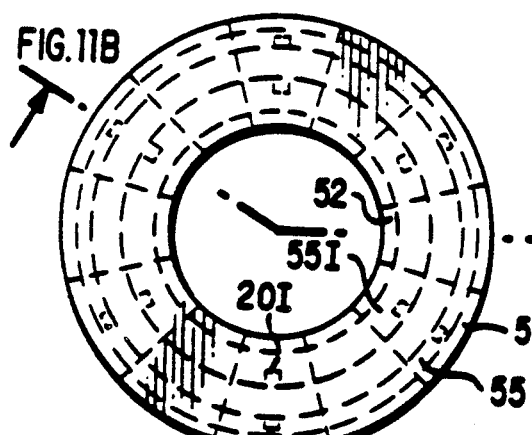
FIGS. 11(A) and 11(B) are bottom and cross-sectional views of another thrust bearing according to the present invention.
Figure 11B:
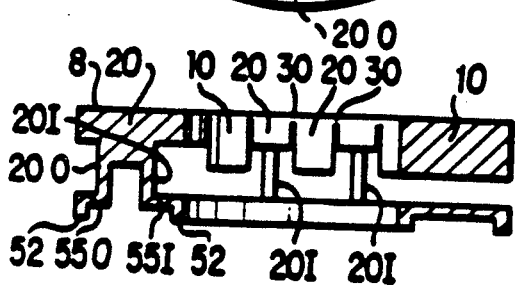

FIGS. 11(A)-11(B) illustrate another embodiment of the bearing of the present invention. As shown in the drawings, this bearing includes a partially rigid portion which includes an inner circumferential support beam 201 and an outer circumferential support beam 200, an inner peripheral membrane 551 and an outer peripheral membrane 550 and inner and outer peripheral support beams 52. As best shown in FIG. 29, the circumferential support beams 201, 200 are defined in part by a deep circumferential channel extending from the bottom of the bearing. The support beams can be further defined by a plurality of holes or openings disposed symmetrically about the bearing pad support structure which divide the beams into multiple beams.

FIGS. 12(A) and 12(B) depict another bearing according to the present invention. In accordance with this construction, the partially rigid member 20 includes a stub portion 20S which is in turn supported on a horizontally oriented portion 20H which is in turn supported on a inversely angled beam portion 20I. The bearings are similar in all other respects. A piezoelectric element 100 may be located between the continuous surface and the horizontal beam portion.

FIG. 13 shows a similar bearing with a vertical beam portion 20 V rather than an inclined beam portion. The absence of an angled portion in the bearing of FIG. 13 tends to give the bearing more rigidity in the vertical direction.

FIGS. 14(A)-14(B) illustrate another embodiment of the bearing construction of the present invention.

The lower portion of each partially rigid member 20 is composed of a relatively rigid outer frustum 20O and nested frustums supported on a secondary support portion which includes a split peripheral membrane 55 which is supported on a pair of peripheral beams 52. The peripheral beams 52 are similar to those of the previously described constructions. The membrane 55 differs from the membrane in previously described constructions since the membrane 55 is radially split by the groove formed in the bottom of the bearing support structure which forms the nested frustums. The outer frustum is inverted with respect to the vertical portion such that the mean centerlines of the portions merge at a point 35 above the support surface 8 and have a cross-section which appears similar to an inverted V. Since the centerlines of the portions intersect at point 35 above the pad surface, the surface is supported for pivoting about a point above the pad surface. This ensures proper deflection.

Alternatively, portions 20O and 20V can be angled toward one another at the same angle, angled toward one another at different angles, one beam angled and one beam not angled, and angled in the same direction. Of course, variations in the degree of angling of the beams in the primary support structure impacts the deflection characteristics of the bearing.

A plurality of holes or openings can be disposed symmetrically about the bearing support structure to divide the inverted V structure into a plurality of support beams and divide the apex of the nested frustums so as to define discrete support beams. In this way, the lower portion of the partially rigid member can be defined by a pair of complex support beams which are tapered toward one another and have a complex geometrical configuration defined by the cylindrically extending openings passing through the inverted V section.

Numerous other modifications to the bearing support structure are possible. For example, deflection of the support structure can be modified by changing the angle of the beams, changing the location of the holes or openings which define the legs, varying the length of any of the beams or membranes, and changing the width or thickness of any of the beams or membranes.

FIG. 15 illustrates a modified bearing in which the outer frustum portion 20O is much less rigid than that of FIGS. 14A and 14B. The bearing is otherwise similar to that of FIGS. 14A and 14B.

FIG. 16 illustrates a modified bearing in which the partially rigid member 20 has a concave-convex beam portion 20C.

FIGS. 20, 20A, 20B, 20C and 20D illustrate another form of continuous surface bearing according to the present invention.

Figure 20:
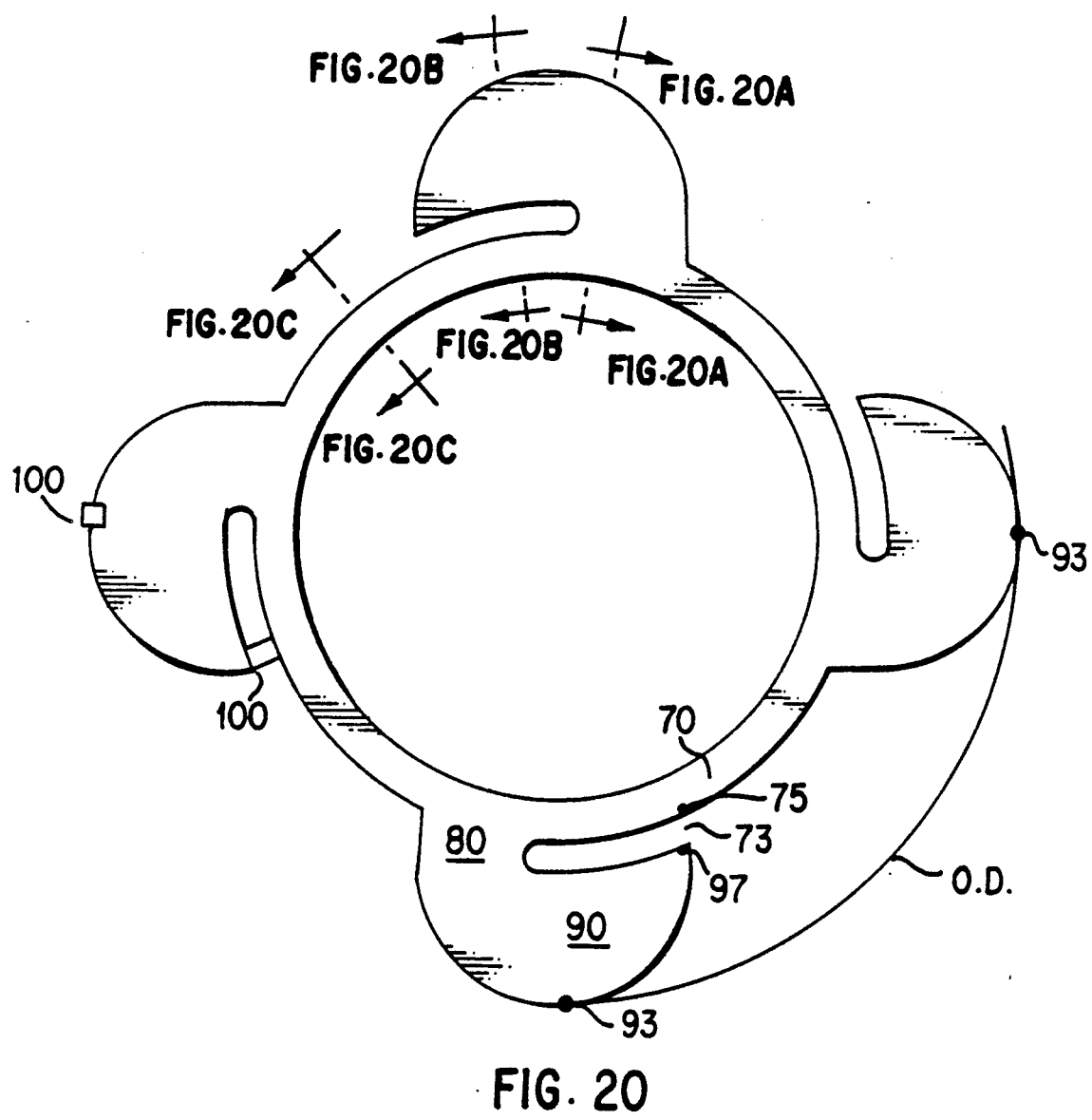
FIG. 20 is a side view of another bearing according to the present invention.

The bearing shown in FIG. 20 is of a type which generally includes at least a continuous cylindrical support surface 70, a plurality of deflectable ear portions having an outside diameter O.D., and a relatively thin neck portion 80 connecting one side of each ear portion 90 to the continuous support surface portion 70. As shown in FIG. 20 the bearing has a ring-like side profile with a plurality of, in this case four, ear-like radial projections. As shown in the partial cross-sectional views of FIGS. 20A, 20B and 20C the bearing has a U-shaped cross section.

The outer diameter (O.D.) of the bearing, defined by the radially outermost surfaces 93 of the ear portions, is significantly larger than the cylindrical housing into which the bearing is to be mounted. However, because of their deflectable connection to the support surface portion 70 via the neck portion 80, the ear portions 90 can be deflected radially inward to enable mounting in the housing. If the outer diameter (O.D.) is properly selected, the ear portion 90 will deflect an amount sufficient to cause deformation of the continuous surface portion 70. The deformation of the continuous surface portion 70 occurs along the lines (greatly exaggerated) illustrated in FIG. 20D. Specifically, the support surface deforms into a series of wedges which, like the previously discussed bearings, enables hydrodynamic support of a rotating shaft. The undeformed shape of the bearing is shown in phantom in FIG. 20D.

Figure 20A:
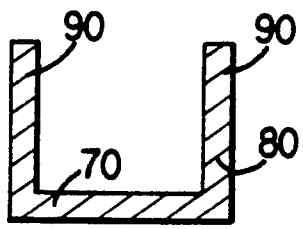
FIG. 20A is a cross-section along the lines indicated in FIG. 20.
Figure 20B:
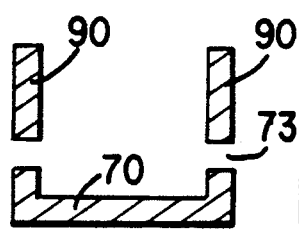
FIG. 20B is a cross-section along the lines indicated in FIG. 20.
Figure 20C:
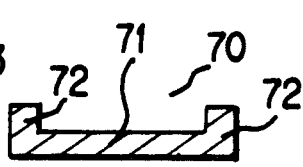
FIG. 20C is a cross-section along the lines indicated in FIG. 20.
Figure 20D:
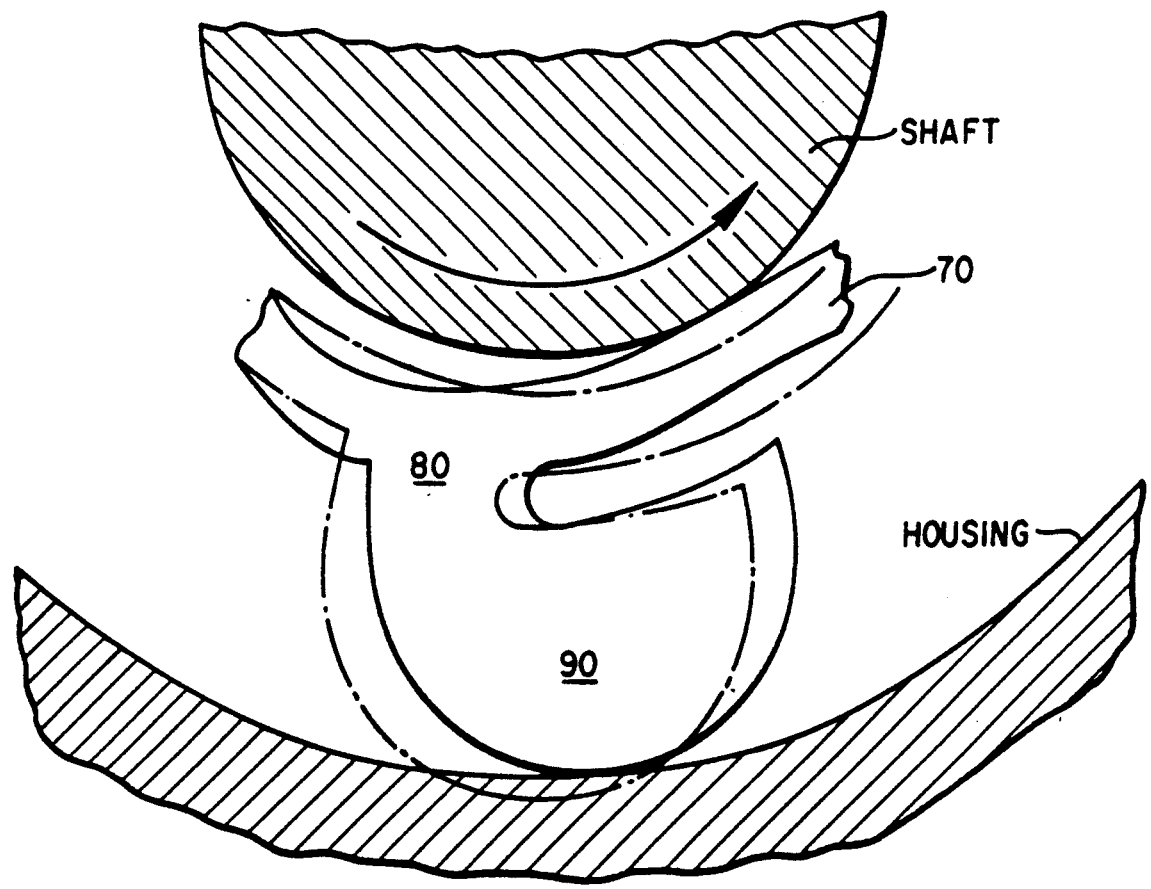
FIG. 20D is a schematic representation of the deflection characteristics of the bearing of FIG. 20.

There are naturally many possible ways to provide the requisite elements of this bearing, i.e, continuous support surface, neck portion and deflectable ear portions. Consequently, there can be numerous structural embodiments of the bearing of the present invention. In the embodiment illustrated in FIGS. 20, 20A, 20B, 20C and 20D the continuous support surface 70 is in the form of a continuous membrane 71 having radially extending leg portions 72 at each axial end thereof. By virtue of this construction, the membrane portion 71 has a tendency to form a channel under load; this helps retain lubricant. The ear portions 90 are formed as extensions of the leg portions 72 and have a somewhat circular appearance as viewed in FIG. 20. Because the ears are formed as extensions of the legs 72, the ears are disposed in circumferentially aligned pairs as shown in FIGS. 20A and 20B. Finally, the neck portion 80 which connects each ear portion 90 to the support surface 70 is formed by providing (such as by cutting) a groove 73 between the support surface 70 and the ear portion 90. By virtue of this construction, the ear portion 90 has radially inner surface 97 which is furtherest from the neck portion 80. It is this surface 97 which moves toward a point 75 on the support surface 70 when the ear portions 90 are deflected to allow the bearing to be mounted in the housing.

While the bearing of FIG. 20 should offer good operational results other forms are possible. For instance, the bearing of FIG. 20 could have a continuous cross section rather than the U-shaped cross section illustrated in FIGS. 20A-2C. If the bearing had a continuous cross section, it would be easily moldable. Also, the thickness of the continuous surface portion 70 could be varied and the size or shape of the neck and ear portions could be entirely different. It is only necessary that the continuous surface 70 be deflected into a series of wedges when the bearing is mounted in the housing.

In accordance with another aspect of the present invention, one or more piezoelectric elements may be mounted within or to the bearing of FIG. 20 to allow precise control of wedge formation when the bearing is in operation. As an example, FIG. 20 shows a piezoelectric element 100 mounted to the radially outermost point 93 of one ear portion 90 and another piezoelectric element 100 mounted to the radially inner contact surface 97 of the same ear portion 90. In practice, piezoelectric elements would be symmetrically used on all the ear portions to ensure symmetrical operation. Further, it is unlikely that piezoelectric elements 100 would be used on both the O.D. surface 93 and the contact surface 97 because, as discussed below, such piezoelectric elements perform essentially the same purpose, i.e. adjusting the effective inward deflection of the ear portions so as to alter the wedge profile.

By providing direct current to the piezoelectric elements 100, the size of the elements can be varied. When the piezoelectric elements 100 are located as discussed above or at some other appropriate location, their expansion or contraction in size causes more or less inward deflection of the support surface 70 proximate to the point 75 and thus increases or decreases the wedge dimension. This, of course, affects wedge quality.

If desired, the piezoelectric elements 100 could be controlled by a central processing unit or CPU. The CPU could be programmed to supply direct current to the piezoelectric elements to achieve a specific desired result pursuant to a manually input command, e.g. "INCREASE WEDGE HEIGHT" Alternatively, or in addition, the CPU could be programmed to supply current to the piezoelectric elements in response to actual operating conditions as determined by sensors capable of sensing physical characteristics such as temperature, torque, fluid pressure and shaft to pad contact which are indicative of wedge quality.

Figure 17A:
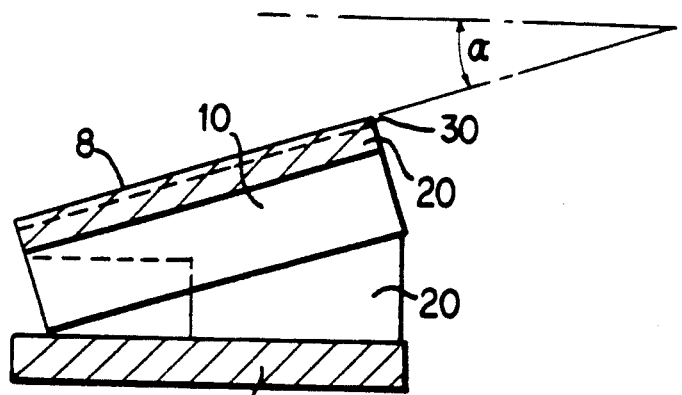
FIG. 17(A) is a sectional view (along the lines shown in FIG. 17(B)) of a combined radial and thrust bearing according to the present invention.
Figure 17C:
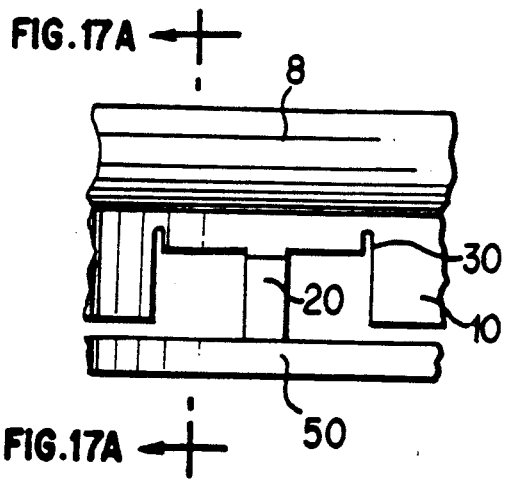
FIG. 17(C) is a flattened side view (along the lines indicated in FIG. 17(B)) of the combined radial and thrust bearing of FIG. 17(A).
Figure 17B:
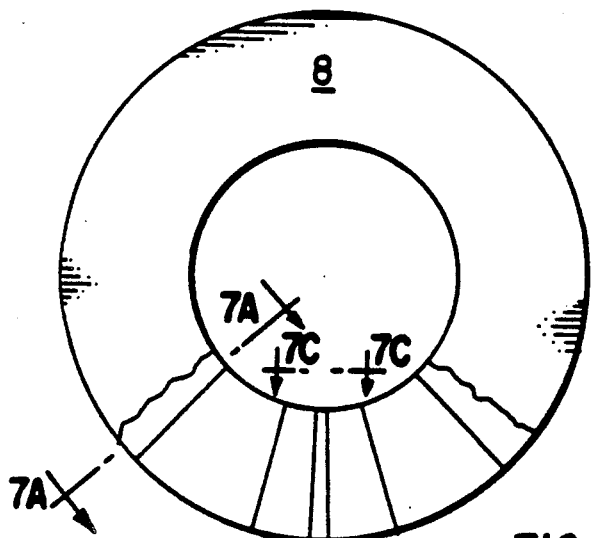
FIG. 17(B) is a top view of the combined radial and thrust bearing of FIG. 17(A).

FIGS. 17(A)–17(C) illustrate a combined thrust and radial hydrodynamic bearing in accordance with the present invention. The bearing illustrated in FIG. 17 is quite similar to the bearing illustrated in FIG. 9 and similar numerals are used to designate similar structure. Radial-thrust bearings which differ from radial-only bearings described heretofore only in that the bearing surface 8 is angled with respect to the major axis can also be constructed. By virtue of its angled bearing surface, the combined radial-thrust bearings support loads acting both along the major axis and radially from the axis.

The shaft which is to be supported by the angled bearing support face, must be fitted with a runner which is angled at an angle complementary to the angle of the bearing support face. The portion of the axial load taken by the bearing and the portion of the radial load taken by the bearing depends on the angle of the pad surface. If the pad is angled at an angle $\alpha$ with respect to the major axis 1006, the axial load applied to the bearing can be determined by the following equation:

Applied Axial Load = Total Load (Sin $\alpha$)

Similarly, the radial load applied to the bearing can be determined by the following equation:

Applied Radial Load = Total Radial Load (Cos $\alpha$).

The support structure for the bearing shown in FIG. 17 is similar to the support structure for the bearing shown in FIG. 9.

Generally, any of the general bearing constructions described in this application can be employed in the design of combined radial-thrust bearings of the type illustrated in FIG. 17. Of course in order to achieve the combined radial and thrust bearing characteristic, the bearing pad surface must be angled at an angle between 0 and 90 degrees with respect to the major axis. Moreover, the need to accommodate both radial and axial loads necessarily will impact the design of the bearing pad support structure.

An important aspect of the present invention is the disclosure of machinable bearing shapes. In other words, bearing shapes which can be produced by machining a piece of heavy walled tubing or similar cylindrical journal using standardly available machining techniques. Such bearings are characterized by the fact that they are formed from a piece of heavy walled tubing or cylindrical or similar cylindrical journal through the provision of bores, slits and grooves. The advantage of such bearings is that it is easy to manufacture prototypes and to modify these prototypes after testing. Naturally, when the bearings are to be mass produced, using, for example, molding or casting techniques, different manufacturing considerations may dictate different shapes. It is important to recognize that changes in shape affect bearing performance.

Another manufacturing consideration is ease of molding. Naturally, most of the bearing constructions of the present invention are capable of being molded by some molding technique. However, only certain shapes can be injection molded in a simple two-piece mold, i.e., a mold which does not include cams. Another advantage of the bearings of the present invention is that the bearings can be constructed with easily moldable shapes which are defined as shapes which can be injection molded using a simple two-piece mold. An easily moldable shape generally is characterized by the absence of "hidden" cavities which require cams for molding. For instance, with respect to radial extending grooves in the inner and outer diameter and a continuous axial cross section. The bearing shown are examples of an easily moldable radial or journal bearing.

Similarly, easily moldable thrust bearings are characterized by the fact that they can be molded with a single seam line such that, for example, when viewed only from the top and bottom, all surfaces are visible.

FIG. 18 illustrates an easily moldable thrust bearing. The bearing includes a support structure which includes rigid portions 10 partially rigid portions 20 and connecting portions 30. The support structure supports surface 8.

Variants of the specific moldable beam structure illustrated are possible. For instance, as with any bearing in accordance with the present invention, the structure could also be varied by varying the length or thickness of any of the elements in the support structure to modify the deflection characteristics of the support structure. The lower portion 20L of the partially rigid portion 20 can be particularly easily modified in terms of size and shape to accommodate various desired performance characteristics.

Figure 18C:
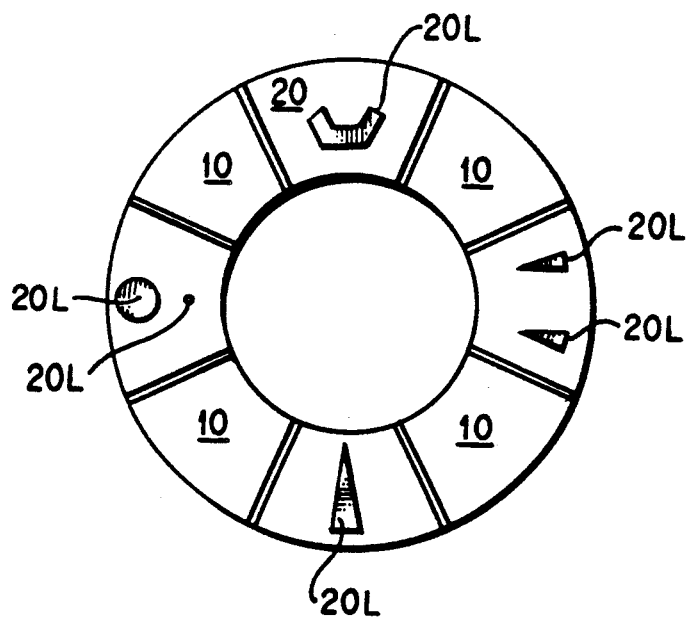
FIGS. 18(A)-(C) depict an easily moldable thrust bearing according to the present invention
Figure 18A:
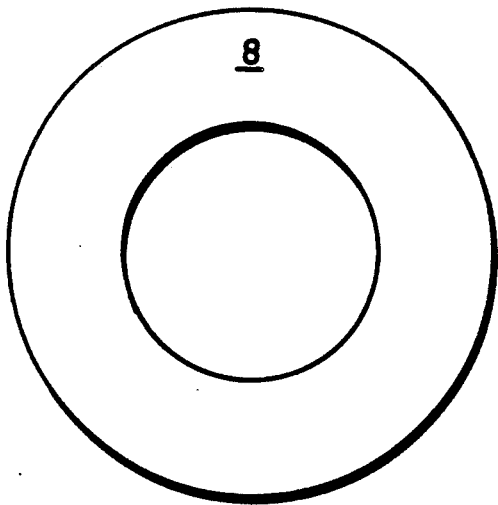
Figure 18B:
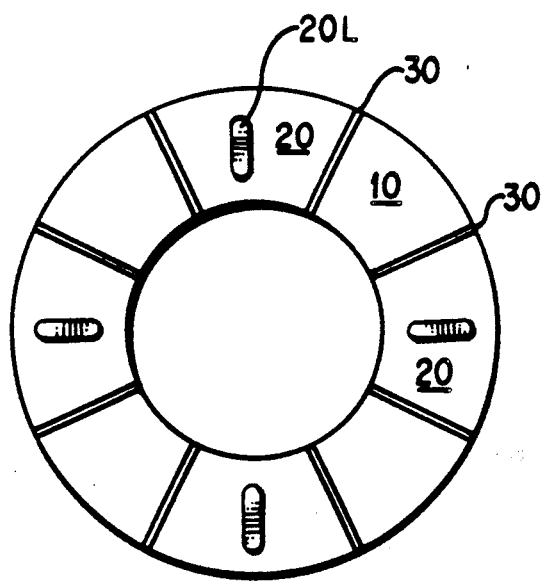

In order to illustrate a number of possible support structure constructions, FIG. 18C depicts a different support structure for each of the partially rigid portions 20. In particular, FIG. 18C is a bottom view with the modifications illustrated herein. It should be understood that these various support structures are shown in a single bearing for purposes of illustrating the present invention. In normal use, each of the partially rigid portions would have an identical, support structure to assure uniform performance.

As is evident from these drawings, the moldable bearings do not include any hidden cavities which would necessitate the use of a complex mold and/or a mold including a displaceable cam. In particular, since each surface of the bearing structure is directly visible in either the top view or the bottom view of FIG. 18, the bearing can be simply molded using a two piece mold. Specifically, a first mold piece defines those surfaces which are directly visible only in the top view of FIG. 18A. The second mold piece defines those surfaces which are only visible in the bottom view of FIG. 18B. Surfaces having edges visible in both FIGS. 18A and 18B can be molded using either or both molds. In the illustrated bearing, easy moldability is achieved because the secondary and tertiary support portions are circumferentially located in the space between bearing pads.

Naturally, each structure provides unique deflection characteristics which must be considered in designing the bearing for optimum wedge formation. Additionally, the characteristics of an "optimum wedge" depend on the intended use of the bearing, e.g., high load vs. low friction.

In certain gas or air lubricated deflection pad bearings, there are cases where loads or speeds exceed the capability of an air film. In these cases, it is necessary to introduce a liquid type lubricant into the converging wedge without providing a liquid reservoir or bath. FIGS. 8 and 9(c) illustrate bearing constructions for achieving this purpose. In particular, these drawings illustrate a novel self lubricating bearing in accordance with another important aspect of the present invention. The bearing is essentially a bearing of the type described herein which has been modified to include lubricating plastic in its various openings.

The plastic employed in the bearing is a conventional castable porous plastic which is capable of absorbing lubricating liquid when soaked in such a liquid. One such plastic is sold under the trade name POREX. Generally, the porous plastic can be formed from various plastics by injecting air into the plastic material to form the pores. Liquid can then be absorbed into the porous plastic in a wick like manner and held in place by the plastic.

The lubricating bearing is constructed by taking a journal, thrust or combined radial and thrust deflection pad bearing of the type described above and casting or injecting the conventional porous plastic around and into the spaces between the deflection members. Ports or openings are provided in the bearing to provide communication between these spaces and the continuous support surface. As a consequence of this construction, during operation, the movement of the shaft and the compression of the support structure causes the lubricating liquid to leave the porous plastic and be drawn through the ports into the converging wedge. The formation of the liquid filled wedge greatly increases the load and speed capability of the bearing.

An important aspect of the present invention is the composite structure combining a standard bearing material with the porous plastic. By virtue of this composite, it is possible to take advantage of the unique characteristics of both materials. More specifically, conventional porous plastics alone make poor deflection pad bearing materials because the pores in the plastic are actual voids that are detrimental to the development of the very thin fluid film. On the other hand, conventional plastic or metal bearing materials not having pores are incapable of absorbing lubricant to any great extent. However, through the use of both materials in the manner described, an effective self-lubricating hydrodynamic bearing can be obtained. Further, there are synergistic results from the combined use of standard bearing material and lubricant absorbing porous plastic. For example, the deflections of the bearing support surface assists in forcing the liquid lubricant into and out of the ports. Moreover, channeling or lubricant retaining deformation of the bearing surface assists in containing the liquid.

FIGS. 8 and 9(c) show two examples of the self lubricating deflection pad bearing of the present invention. In particular, these drawings show bearings similar to bearings described previously which have been modified to include the liquid absorbing porous plastic filled into the spaces between the deflection members. To some extent, the bearing acts as a skeletal portion and the porous plastic portion acts as a lubricant retaining and releasing sponge.

FIG. 8 shows a self-lubricating bearing having an underlying bearing structure which is essentially identical to the bearing shown in FIG. 4. However, the bearing structure of FIG. 8 is modified such that porous plastic fills the openings in the support structure and lubricant passages are provided to communicate lubricant with the bearing surface 8.

Likewise, FIG. 9(C) shows a perspective view of the bearing construction of FIGS. 9(A) and 9(B). However, porous plastic has been injected into the interstices or spaces within the support structure between the end between the pads. Lubricant passages are again provided to allow lubricant to reach the bearing surface.

Specifically, like the bearing of FIG. 8, the inner diameter of the bearing of FIG. 9(C) includes spaced lubricant releasing and absorbing and retaining openings. In operation, the movement of the shaft and the compression of the deflection members causes the lubricating liquid to leave the porous plastic and to be drawn into the "leading edge" of the converging wedge. The formation of the liquid filled wedge greatly increases the load and speed capability of the bearings.

The manufacture of the self-lubricating deflection pad bearing involves three general steps. First, the basic bearing or skeletal portion is formed from standard bearing material. This skeletal portion must include lubricant passages. Second, the porous plastic is injected into the desired spaces in the bearing structure. For purposes of manufacturing convenience, the plastic is injected to the bearing without lubricant. Finally, the bearing with the porous plastic injected into the desired spaces is loaded with liquid lubricant. To properly load the plastic with liquid lubricant, it is necessary to wick the lubricant in from one side.

As noted with respect to each of the illustrative examples described above, the bearings of the present invention can be formed to provide for a wedge ratio of 1:2 to 1:5, have a deformable bearing surface the shape of which can be modified, allow six degrees of freedom of the pad, and provide a dashpot type damping action. The bearings are typically of a unitary construction.

By virtue of the wedge formed by deflection of the bearing surface and the ability of the surface to move with six degrees of freedom, the bearings of the present invention exhibit exceptional performance characteristics. Specifically, the bearing dimensions and deflection variables including number, size, shape, location and material characteristics of the elements defined in the unitary bearing can be tailored for any specific application to support a wide variety of loads. Of these variables, the shape of the support structure and additional support portion is particularly important. The impact of shape of the support members on the deflection characteristics of the support structure can be appreciated when the variable formula for moment of inertia $bh^3/12$ (English units) (the main component of sectional modulus for rectangular section, $z=I/c=bh^2/6$) used in an example. Moreover, the ability of the pad to move with six degrees of freedom allows the bearing to compensate for and correct shaft misalignment. In this regard it is noted that the bearings of the present invention have a self correcting characteristic resulting from the tendency of the bearing to return to its non-deflected state due to the stiffness of the bearing. Of course, the stiffness of the bearing is primarily a function of the shape of the support structure, and to a lesser extent the other deflection variables including number, size, location, and material characteristics of the elements defined by the grooves and cuts or slits formed in the unitary element. Stiffer bearings have a greater self-correcting tendency but are less able to adjust for shaft misalignment.

In small quantities, the bearings disclosed herein are preferably constructed by electrical discharge machining or laser cutting methods. The double lines shown in the drawings (e.g., FIGS. 5 and 6) are the actual paths of the wire or beam which is typically 0.002–0.060"(0.50–1.52 mm) in diameter. The lubricant that flows into the electrical discharge machine paths, acts as a fluid dampener that reduces any vibration or instability at resonant frequencies. In the situations described above where a continuous cylindrical membrane is formed, the damping takes the form of a dashpot that exhibits high damping characteristics. A significant consideration in the design is that the support structure length and direction be oriented to provide the inward deflection. Also minute deflections of the pads themselves in the direction of load result in eccentricity changes which further improve bearing performance. It is noted that in Faires, Design of Machine Elements, the distance between the center of the bearing and the center of the shaft is called the eccentricity of the bearing. This terminology is well known to those skilled in bearing design. With the novel approach of tuning or modifying the stiffness of the bearing configuration or structure and particularly the beam to suit a particular bearing application, optimum performance is readily obtained. Recent computer analysis has demonstrated that virtually any stiffness or deflection may be accomplished.

As noted above, when manufacturing low volumes or prototypes of the bearings of the present invention, the bearings are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to employ plastics, ceramics, powdered metals or composites to form the bearings of the present invention. It is believed that methods such as injection molding, casting, powdered metal die casting with sintering and extrusion are sufficiently well known that the processes need not be detailed herein. It is also believed that once a prototype bearing is constructed, the method of producing a mold or the like for mass production of the bearing is well known to those skilled in the molding and casting art. Moreover, it is to be understood that only certain types of the bearings of the present invention are adapted to be made in high volumes through extrusion. Generally, these are the bearings that are formed only through the provision of circumferential grooves and radial and circumferential cuts or slits which extend axially throughout the entire bearing. In other words, those bearings having a constant or otherwise extrudable cross-section.

In accordance with another aspect of the present invention, a novel investment casting method has been found to be particularly useful in the manufacture of intermediate quantities, e.g., less than 5,000 bearings. In accordance with this method of manufacture, the first step of the investment casting procedure is manufacture of a prototype bearing. As discussed above and detailed below, the prototype can be manufactured in any number of ways, but is preferably manufactured by machining a piece of heavy walled tubing or similar cylindrical journal. In larger bearings, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. However, in either application the journals are typically turned and milled to form the larger grooves.

After the prototype bearing is formed, it may be desirable to test the prototype to confirm that the bearing functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the bearing.

After the wax casting is obtained, it is used to form a plaster mold. This step typically involves encasing the wax casting and plaster, allowing the plaster to harden around the wax casting so as to form a plaster mold.

The plaster mold can then be used to form a bearing. Specifically, molten bearing material, such as bronze, is poured into the plaster mold so as to melt and displace the wax casting from the mold. Thus, the plaster mold is filled with molten bearing material and the melted wax is removed from the plaster mold.

After the molten bearing material is allowed to harden, the plaster mold is removed from around the bearing and a bearing is obtained.

Because this method of manufacture involves the sacrifice of a wax casting, it is known as investment casting or sacrificial casting.

Despite the fact that the investment or sacrificial casting method described above involves sacrifice of a wax casting and the production of both rubber and plaster molds, and is quite labor intensive, it has proven to be cost effective when intermediate quantities, e.g., less than 5,000 units, of a particular bearing are required. The cost effectiveness of this procedure for lower quantity bearing requirements is due to the fact that the molds used in this method are far less expensive to produce than the complex mold required for injection molding or powdered metal casting.

As noted above, the first step in the investment casting method, indeed in any method, of producing bearings in accordance with the present invention is the production of a prototype bearing. In accordance with another aspect of the present invention, the relatively complex journal and thrust bearings of the present invention can be formed using simple manufacturing techniques. Similar techniques are used for both thrust and journal bearings.

With the foregoing in mind, it is believed sufficient to describe the method of making a single journal bearing through the use of electrical discharge manufacturing and machining. It is believed that a description of such manufacture demonstrates the ease with which the relatively complex bearing shapes of the present invention can be achieved.

Figure 19A:
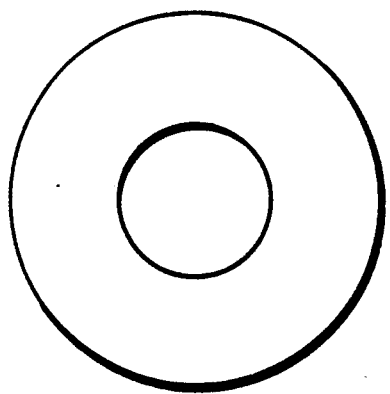
FIG. 19(A) is a side view of a cylindrical journal or blank prior to machining.
Figure 19D:
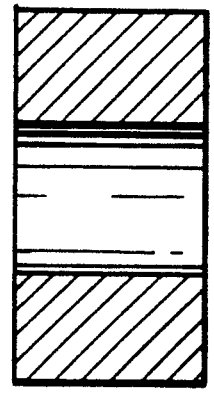
FIG. 19(D) is a cross-section of the journal of FIG. 19(A).
Figure 19B:
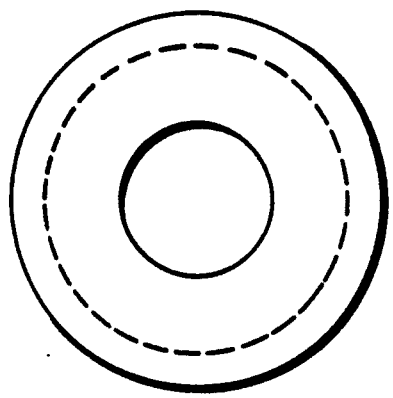
FIG. 19(B) is a side view of a machined journal or blank.
Figure 19E:
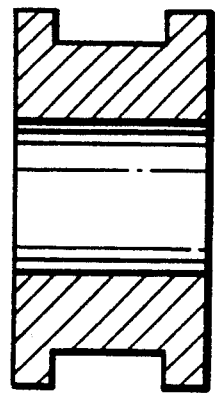
FIG. 19(E) is a cross-section of the journal of FIG. 19(B).

Each bearing is initially in the form of a cylindrical blank having a cylindrical bore as shown in FIG. 19A. The blank is then machined to provide a radial lubricating fluid groove or peripheral undercut as shown in FIGS. 19B. For certain applications, it is desirable to further machine the blank to include facing grooves which are preferably symmetrically disposed on the radial faces of the bearing. The provision of such facing grooves ultimately results in a bearing which is easily torsionally deflected. It is possible to provide cylindrical or tapered grooves or bores. Tapered grooves yield a bearing which exhibits improved deflection characteristics by virtue of the angled alignment of the support beams if the support beams are tapered along lines which converge at a point proximate the center line of the shaft. This ensures that flexibility occurs about the shaft center line by establishing a center of action for the entire system such that the pads may adjust to shaft misalignment. In essence, the tapering of the support beams causes the bearing to act in a manner similar to a spherical bearing by concentrating the support forces on a single point about which the shaft may pivot in all directions to correct any misalignment. The arrows in FIG. 14A illustrate the lines of action of the deflection.

Bearings having cross sections of the type shown in FIGS. 19B are particularly effective at retaining the hydrodynamic fluid. This is because the bearing pad is supported proximate the axial ends of the bearing pad and the central portion of the bearing pad is not directly supported. By virtue of this construction, the bearing pad is supported so as to deform under load to form a fluid retaining concave pocket, i.e. the central portion of the bearing pad deflects radially outward. This greatly decreases fluid leakage. Naturally, the degree of pocket formation depends of the relative dimensions of the bearing pad and support structure. A larger fluid retaining pocket could be obtained by providing a thinner bearing surface and supporting the pad surface at the extreme axial ends of the bearing pad.

Figure 19C:
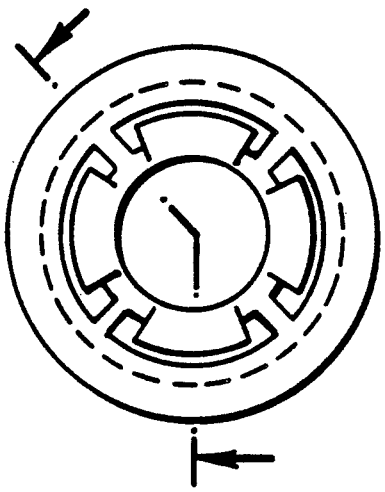
FIG. 19(C) is a side view of the journal or blank of FIG. 19(B) further machined.
Figure 19F:
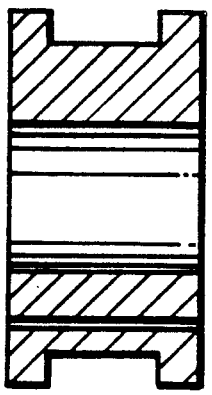
FIG. 19(F) is a cross-section of the journal of FIG. 19(C).

After the cylindrical blank is properly machined as shown in FIGS. 19B radial and/or circumferential slits or grooves are formed along the radial face of the machined blank to define the support structure. FIG. 19C illustrates such grooves formed in the machined blank of FIG. 19B and 14B. When manufacturing low volumes of the bearings or prototypes of the bearings for use in the construction of a mold, the cuts or slits are preferably formed through electrical discharge manufacturing or through the use of a laser. The machining of the cylindrical blanks to achieve the configurations illustrated in FIG. 19B one of the other shapes discussed above can be done through conventional machine tools such as lathe or the like.

Although the foregoing discussion is specifically directed to journal bearings, the principles apply just as well to thrust bearings. For instance, the thrust bearing shown in FIG. 9 can be formed by machining a section of heavy walled tubing to provide radially inner and outer grooves, facing grooves, axial bores, radial cuts and chamfers so as to define bearing pads and support structure.

The performance characteristics of the bearings of the present invention results from the relative shape, size, location and material characteristics of the bearing pads and the beam supports defined by the bores and cuts or slits formed in the machined blank. These parameters are largely defined by the dimensions and location of the radial circumferential bores, cuts or slits formed in the bearing in conjunction with the shape of the machined blank in which the bores or slits are formed to yield the bearing.

As noted above, while the construction of the bearings of the present invention is most easily understood by reference to the machining process, larger quantities are preferably manufactured through the investment casting methods of the present invention, and even larger scale production of the bearings contemplated by the present invention could be more economically performed through injection molding, casting, powdered metal, die casting, extrusion or the like.

In extruding a large number of bearings from a pipe-like cylindrical blank, radial lubricating fluid grooves as shown in FIG. 19B can be provided along the length of the pipe-like cylindrical blank prior to extrusion. However, if facing grooves are desired int he bearing, these can be individually defined after slicing the individual bearings from the extruded and machined blank. For this reason, extrusion might not be a preferred method of producing bearings which require facing grooves to enhance torsional flexibility.

What is claimed is:

1. A hydrodynamic bearing adapted to support a shaft, the bearing comprising:
   a continuous bearing surface;
   a support structure supporting the continuous bearing surface, the support structure comprising a repeating series of support sections, each support section comprising:
   (a) a fully rigid portion, the fully rigid portion being substantially rigid in all directions;
   (b) a partially rigid portion, the partially rigid portions being substantially rigid in a first direction transverse to the portion of the bearing surface which it supports but flexible in a second direction which is substantially transverse to the first direction;
   (c) a first connecting portion connecting the fully rigid portions to the partially rigid portion along a line, the first connecting portion being thin along the line of connection so that the first connecting portion has substantially reduced moment carrying ability; and
   (d) a second connecting portion connecting the partially rigid portion to the fully rigid portion of an adjacent support section along a line, the second connecting portion being thin along the line of connection so that the second connecting portion has substantially reduced moment carrying ability;

the support structure supporting the bearing surface such that under the action of friction and pressure the bearing surface deforms so as to form a substantially circumferentially spaced series of hydrodynamic wedges.

2. The bearing of claim 1, wherein the partially rigid portion in each support section comprises a portion having an upper part and a lower part, the upper part being significantly wider than the lower part.

3. The bearing of claim 2, wherein the partially rigid portion in each support section has a T-shaped section, the first and second connection portions extending from opposed ends of the upper part of the T-section.

4. The bearing of claim further comprising an additional support portion which supports the unitary support structure.

5. The bearing of claim 4, wherein the additional support portion comprises a continuous membrane and a pair of continuous peripheral beams extending from edges of the membrane, each of the partially rigid portions of the unitary support structure being connected to the membrane.

6. The bearing of claim 5, wherein the additional support portion comprises at least one beam supporting each partially rigid portion, and at least one additional beam supporting said at least one beam.

7. The bearing of claim 1, wherein the partially rigid portion has a reduced section in two transverse directions so that the partially rigid portion is flexible in these two transverse directions, the two transverse directions being substantially transverse to the first direction.

8. The bearing of claim 1, wherein the bearing is a thrust bearing and the continuous bearing surface is substantially planar.

9. The bearing of claim 1, wherein the bearing is a radial bearing and the continuous bearing surface is substantially cylindrical.

10. The bearing of claim 1, wherein the bearing is a combined radial and thrust bearing and the bearing surface is frustoconical.

11. The bearing of claim 1, wherein the unitary support structure is nonsymmetrical such that the support structure is biased in one direction.

12. The bearing of claim 1, wherein the unitary support structure is symmetrical such that the bearing can support a shaft rotating in two directions.

13. The bearing of claim 1, wherein the bearing is designed to have an easily moldable shape.

14. The bearing of claim 1, wherein the radial cuts and cylindrical grooves are filled with a porous plastic.

15. The bearing of claim 14 wherein, the porous plastic is loaded with lubricant.

16. The bearing of claim 1, wherein each support section further comprises at least one piezoelectric element for allowing adjustment of the deflection characteristics of the bearing.

* * * * *